(12) United States Patent
Huang et al.

(10) Patent No.: US 8,964,783 B2
(45) Date of Patent: Feb. 24, 2015

(54) USER INPUT BACK CHANNEL FOR WIRELESS DISPLAYS

(75) Inventors: Xiaolong Huang, San Diego, CA (US); Vijayalakshmi R. Raveendran, San Diego, CA (US); Xiaodong Wang, San Diego, CA (US); Fawad Shaukat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 13/344,262

(22) Filed: Jan. 5, 2012

(65) Prior Publication Data

US 2013/0003622 A1 Jan. 3, 2013

Related U.S. Application Data

(60) Provisional application No. 61/435,194, filed on Jan. 21, 2011, provisional application No. 61/447,592, filed on Feb. 28, 2011, provisional application No. 61/448,312, filed on Mar. 2, 2011, provisional (Continued)

(51) Int. Cl.
*H04J 3/24* (2006.01)
*H04L 29/06* (2006.01)

(52) U.S. Cl.
CPC .................... *H04L 65/608* (2013.01)
USPC ............ 370/474; 370/230; 370/252; 370/389

(58) Field of Classification Search
USPC ......... 370/230, 236, 252, 310, 349, 389, 392, 370/471, 474
See application file for complete search history.

(56) References Cited

U.S. PATENT DOCUMENTS

| 4,791,554 A | 12/1988 | Hirota et al. |
| 5,835,723 A | 11/1998 | Andrews et al. |
| 5,925,137 A | 7/1999 | Okanoue et al. |
| 6,049,549 A | 4/2000 | Ganz et al. |
| 6,195,680 B1 | 2/2001 | Goldszmidt et al. |
| 6,252,889 B1 | 6/2001 | Patki et al. |
| 6,266,690 B1 | 7/2001 | Shankarappa et al. |

(Continued)

FOREIGN PATENT DOCUMENTS

| CN | 1437355 A | 8/2003 |
| CN | 1561609 A | 1/2005 |

(Continued)

OTHER PUBLICATIONS

Byungjoo Lee, U.S. Appl. No. 61/433,942, filed Jan. 18, 2011.*

(Continued)

*Primary Examiner* — Kwang B Yao
*Assistant Examiner* — Nguyen Ngo
(74) *Attorney, Agent, or Firm* — Donald C. Kordich

(57) ABSTRACT

As part of a communication session, a wireless source device can transmit audio and video data to a wireless sink device, and the wireless sink device can transmit user inputs received at the wireless sink device back to the wireless source device. In this manner, a user of the wireless sink device can control the wireless source device and control the content that is being transmitted from the wireless source device to the wireless sink device. As part of transmitting user input to the source device, the sink device can generate a data packet that identifies a user input category for the user input, and the source device can process the data packet based on the user input category.

48 Claims, 17 Drawing Sheets

Related U.S. Application Data application No. 61/450,101, filed on Mar. 7, 2011, provisional application No. 61/467,535, filed on Mar. 25, 2011, provisional application No. 61/467,543, filed on Mar. 25, 2011, provisional application No. 61/514,863, filed on Aug. 3, 2011, provisional application No. 61/544,461, filed on Oct. 7, 2011.

(56) References Cited

U.S. PATENT DOCUMENTS

| | | | |
|---|---|---|---|
| 6,400,720 B1 | 6/2002 | Ovadia et al. | |
| 6,424,626 B1 | 7/2002 | Kidambi et al. | |
| 6,515,992 B1 | 2/2003 | Weston et al. | |
| 6,594,699 B1 | 7/2003 | Sahai et al. | |
| 6,608,841 B1 | 8/2003 | Koodli | |
| 6,748,195 B1 | 6/2004 | Phillips | |
| 6,760,772 B2 | 7/2004 | Zou et al. | |
| 6,801,530 B1 | 10/2004 | Brandt et al. | |
| 6,876,857 B1 | 4/2005 | Nee et al. | |
| 6,917,976 B1 | 7/2005 | Slaughter et al. | |
| 6,963,921 B1 | 11/2005 | Yang et al. | |
| 7,035,281 B1 | 4/2006 | Spearman et al. | |
| 7,085,420 B2 | 8/2006 | Mehrotra | |
| 7,099,629 B1 | 8/2006 | Bender | |
| 7,324,462 B1 | 1/2008 | Page et al. | |
| 7,328,021 B1 | 2/2008 | Satapathy | |
| 7,333,464 B2 | 2/2008 | Yang et al. | |
| 7,366,204 B2 | 4/2008 | Kang et al. | |
| 7,373,415 B1 | 5/2008 | DeShan et al. | |
| 7,376,155 B2 | 5/2008 | Ahn et al. | |
| 7,477,659 B1 | 1/2009 | Nee et al. | |
| 7,519,470 B2 | 4/2009 | Brasche et al. | |
| 7,529,823 B2 | 5/2009 | Trufinescu et al. | |
| 7,565,357 B2 | 7/2009 | Rao | |
| 7,688,859 B2 | 3/2010 | Chen et al. | |
| 7,696,980 B1 | 4/2010 | Piot et al. | |
| 7,712,670 B2 | 5/2010 | Sauerwein, Jr. et al. | |
| 7,716,385 B2 | 5/2010 | Saint-Hilaire et al. | |
| 7,719,972 B2 | 5/2010 | Yuan et al. | |
| 7,720,096 B2 | 5/2010 | Klemets | |
| 7,768,536 B2 | 8/2010 | Hyatt | |
| 7,835,406 B2 * | 11/2010 | Oran et al. | 370/522 |
| 7,868,890 B2 | 1/2011 | Ludwin et al. | |
| 7,881,315 B2 | 2/2011 | Haveson et al. | |
| 7,929,475 B2 | 4/2011 | Simonson et al. | |
| 8,001,384 B2 | 8/2011 | Yamamoto et al. | |
| 8,102,849 B2 | 1/2012 | Martinez Bauza et al. | |
| 8,157,168 B2 | 4/2012 | Sauerwein, Jr. et al. | |
| 8,364,201 B1 | 1/2013 | Fujisaki | |
| 8,406,961 B2 | 3/2013 | Pathak et al. | |
| 8,428,048 B2 | 4/2013 | Walker et al. | |
| 8,437,347 B2 | 5/2013 | Casaccia et al. | |
| 8,466,870 B2 | 6/2013 | Cohen et al. | |
| 8,517,251 B2 | 8/2013 | Cohen et al. | |
| 8,593,996 B2 | 11/2013 | Lee et al. | |
| 8,605,584 B2 | 12/2013 | Leung et al. | |
| 8,612,619 B2 | 12/2013 | Guo et al. | |
| 2002/0007494 A1 | 1/2002 | Hodge | |
| 2002/0097718 A1 | 7/2002 | Korus et al. | |
| 2003/0031152 A1 | 2/2003 | Gohda et al. | |
| 2003/0064752 A1 | 4/2003 | Adachi et al. | |
| 2003/0110297 A1 | 6/2003 | Tabatabai et al. | |
| 2003/0142631 A1 | 7/2003 | Silvester | |
| 2003/0152098 A1 | 8/2003 | Zhu | |
| 2003/0225737 A1 | 12/2003 | Mathews | |
| 2004/0039934 A1 | 2/2004 | Land et al. | |
| 2004/0071169 A1 | 4/2004 | Abe et al. | |
| 2004/0083284 A1 | 4/2004 | Ofek et al. | |
| 2004/0103282 A1 | 5/2004 | Meier et al. | |
| 2004/0147264 A1 | 7/2004 | Ogawa | |
| 2004/0160967 A1 | 8/2004 | Fujita et al. | |
| 2004/0202249 A1 | 10/2004 | Lo et al. | |
| 2004/0214571 A1 | 10/2004 | Hong | |
| 2005/0021810 A1 | 1/2005 | Umemura et al. | |
| 2005/0044142 A1 | 2/2005 | Garrec et al. | |
| 2005/0058090 A1 | 3/2005 | Chang et al. | |
| 2005/0060750 A1 | 3/2005 | Oka et al. | |
| 2005/0085239 A1 | 4/2005 | Cedervall | |
| 2005/0096086 A1 | 5/2005 | Singamsetty | |
| 2005/0102699 A1 * | 5/2005 | Kim et al. | 725/81 |
| 2005/0111361 A1 | 5/2005 | Hosein | |
| 2005/0130611 A1 | 6/2005 | Lu et al. | |
| 2005/0136990 A1 | 6/2005 | Hardacker et al. | |
| 2005/0138193 A1 | 6/2005 | Encarnacion et al. | |
| 2005/0144225 A1 | 6/2005 | Anderson et al. | |
| 2005/0149976 A1 | 7/2005 | Lupoi et al. | |
| 2005/0152330 A1 | 7/2005 | Stephens et al. | |
| 2005/0166241 A1 * | 7/2005 | Kim et al. | 725/81 |
| 2005/0175321 A1 | 8/2005 | Aridome et al. | |
| 2005/0176429 A1 | 8/2005 | Lee et al. | |
| 2005/0198663 A1 | 9/2005 | Chaney et al. | |
| 2005/0266798 A1 | 12/2005 | Moloney et al. | |
| 2005/0271072 A1 | 12/2005 | Anderson et al. | |
| 2006/0002320 A1 | 1/2006 | Costa-Requena et al. | |
| 2006/0002395 A1 | 1/2006 | Araki et al. | |
| 2006/0013182 A1 | 1/2006 | Balasubramanian et al. | |
| 2006/0028398 A1 | 2/2006 | Willmore | |
| 2006/0050640 A1 | 3/2006 | Jin et al. | |
| 2006/0053459 A1 | 3/2006 | Simerly et al. | |
| 2006/0058003 A1 | 3/2006 | Lee | |
| 2006/0069797 A1 | 3/2006 | Abdo et al. | |
| 2006/0098593 A1 | 5/2006 | Edvardsen et al. | |
| 2006/0101146 A1 | 5/2006 | Wang | |
| 2006/0103508 A1 | 5/2006 | Sato | |
| 2006/0133414 A1 | 6/2006 | Luoma et al. | |
| 2006/0136963 A1 | 6/2006 | Oh et al. | |
| 2006/0146009 A1 | 7/2006 | Syrbe et al. | |
| 2006/0187964 A1 | 8/2006 | Li et al. | |
| 2006/0198448 A1 | 9/2006 | Aissi et al. | |
| 2006/0199537 A1 | 9/2006 | Eisenbach | |
| 2006/0202809 A1 | 9/2006 | Lane et al. | |
| 2006/0203805 A1 | 9/2006 | Karacali-Akyamac et al. | |
| 2006/0209787 A1 | 9/2006 | Okuda | |
| 2006/0218298 A1 | 9/2006 | Knapp et al. | |
| 2006/0222246 A1 | 10/2006 | Murai et al. | |
| 2006/0223442 A1 | 10/2006 | Stephens | |
| 2006/0233191 A1 | 10/2006 | Pirzada et al. | |
| 2006/0236250 A1 | 10/2006 | Gargi | |
| 2006/0256851 A1 | 11/2006 | Wang et al. | |
| 2006/0268869 A1 | 11/2006 | Boers et al. | |
| 2006/0270417 A1 | 11/2006 | Chi | |
| 2006/0288008 A1 | 12/2006 | Bhattiprolu et al. | |
| 2007/0004387 A1 | 1/2007 | Gadamsetty et al. | |
| 2007/0008922 A1 | 1/2007 | Abhishek et al. | |
| 2007/0016654 A1 | 1/2007 | Bowles et al. | |
| 2007/0022195 A1 * | 1/2007 | Kawano et al. | 709/225 |
| 2007/0037600 A1 | 2/2007 | Fukuda | |
| 2007/0043550 A1 | 2/2007 | Tzruya | |
| 2007/0057865 A1 | 3/2007 | Song et al. | |
| 2007/0057885 A1 | 3/2007 | Kurumisawa et al. | |
| 2007/0061433 A1 | 3/2007 | Reynolds et al. | |
| 2007/0104215 A1 | 5/2007 | Wang et al. | |
| 2007/0126715 A1 | 6/2007 | Funamoto | |
| 2007/0141984 A1 | 6/2007 | Kuehnel et al. | |
| 2007/0141988 A1 | 6/2007 | Kuehnel et al. | |
| 2007/0162945 A1 | 7/2007 | Mills | |
| 2007/0171910 A1 | 7/2007 | Kumar | |
| 2007/0182728 A1 | 8/2007 | Fujimori | |
| 2007/0211041 A1 | 9/2007 | Lai et al. | |
| 2007/0259662 A1 | 11/2007 | Lee et al. | |
| 2007/0264988 A1 | 11/2007 | Wilson et al. | |
| 2007/0264991 A1 | 11/2007 | Jones et al. | |
| 2007/0274400 A1 | 11/2007 | Murai et al. | |
| 2007/0291636 A1 | 12/2007 | Rajagopal et al. | |
| 2007/0292135 A1 * | 12/2007 | Guo et al. | 398/106 |
| 2008/0005348 A1 | 1/2008 | Kosiba et al. | |
| 2008/0013658 A1 | 1/2008 | Lewis et al. | |
| 2008/0018657 A1 * | 1/2008 | Montag | 345/581 |
| 2008/0031210 A1 | 2/2008 | Abhishek et al. | |
| 2008/0037506 A1 | 2/2008 | Dharmaraju et al. | |
| 2008/0037785 A1 | 2/2008 | Gantman et al. | |
| 2008/0045149 A1 | 2/2008 | Dharmaraju et al. | |
| 2008/0046944 A1 | 2/2008 | Lee et al. | |
| 2008/0109763 A1 | 5/2008 | Lee | |

(56) References Cited

U.S. PATENT DOCUMENTS

| | | |
|---|---|---|
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1 | 6/2008 | Khedouri et al. |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. et al. |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0281103 A1 | 11/2010 | Imai et al. |
| 2010/0289871 A1* | 11/2010 | Tatsuta et al. ............ 348/42 |
| 2010/0289872 A1* | 11/2010 | Funabiki et al. ............ 348/43 |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0072473 A1 | 3/2011 | Funabiki et al. |
| 2011/0107388 A1* | 5/2011 | Lee et al. ............ 725/118 |
| 2011/0115818 A1 | 5/2011 | Chung et al. |
| 2011/0128442 A1* | 6/2011 | Blanchard et al. ............ 348/468 |
| 2011/0145879 A1 | 6/2011 | Rajamani et al. |
| 2011/0149806 A1* | 6/2011 | Verma et al. ............ 370/255 |
| 2011/0157470 A1* | 6/2011 | Tsuruga et al. ............ 348/554 |
| 2011/0164058 A1 | 7/2011 | Lemay |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1* | 12/2011 | Bathiche et al. ............ 709/228 |
| 2012/0036543 A1* | 2/2012 | George et al. ............ 725/106 |
| 2012/0036549 A1* | 2/2012 | Patel et al. ............ 725/153 |
| 2012/0044985 A1* | 2/2012 | Tao et al. ............ 375/240.01 |
| 2012/0084670 A1 | 4/2012 | Momchilov |
| 2012/0099566 A1 | 4/2012 | Laine et al. |
| 2012/0113113 A1* | 5/2012 | Hong ............ 345/419 |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0047189 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0238702 A1 | 9/2013 | Sheth et al. |
| 2013/0246665 A1* | 9/2013 | Lee et al. ............ 710/11 |
| 2013/0272628 A1 | 10/2013 | Lee |
| 2013/0304794 A1* | 11/2013 | Verma et al. ............ 709/201 |
| 2014/0019653 A1 | 1/2014 | Amchislavsky et al. |
| 2014/0096164 A1 | 4/2014 | Bei et al. |

FOREIGN PATENT DOCUMENTS

| | | |
|---|---|---|
| CN | 1596004 A | 3/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |
| CN | 101018330 A | 8/2007 |
| CN | 101083825 A | 12/2007 |
| CN | 101247249 A | 8/2008 |
| CN | 101247250 A | 8/2008 |
| EP | 1203080 A2 | 5/2002 |
| EP | 1206080 A1 | 5/2002 |
| EP | 1233326 A2 | 8/2002 |
| EP | 1325591 A1 | 7/2003 |
| EP | 1333373 A1 | 8/2003 |
| EP | 1385336 A2 | 1/2004 |
| EP | 1517228 A2 | 3/2005 |
| EP | 1550264 A1 | 7/2005 |
| EP | 1653678 A2 | 5/2006 |
| EP | 1944946 | 7/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H08237628 A | 9/1996 |
| JP | 2000278320 A | 10/2000 |
| JP | 2000354031 A | 12/2000 |
| JP | 2001034250 A | 2/2001 |
| JP | 2001282673 A | 10/2001 |
| JP | 2002064725 A | 2/2002 |
| JP | 2002142210 A | 5/2002 |

(56) References Cited

FOREIGN PATENT DOCUMENTS

| | | |
|---|---|---|
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 A | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| RU | 2207723 C1 | 6/2003 |
| RU | 2005113275 A | 10/2005 |
| RU | 2269873 C2 | 2/2006 |
| TW | 496058 | 7/2002 |
| TW | I239179 | 9/2005 |
| TW | 200618653 | 6/2006 |
| TW | 200838310 A | 9/2008 |
| TW | 200943168 A | 10/2009 |
| WO | WO-0184291 A1 | 11/2001 |
| WO | WO-02010942 | 2/2002 |
| WO | 0223825 A1 | 3/2002 |
| WO | 0249314 A2 | 6/2002 |
| WO | 03061240 A1 | 7/2003 |
| WO | WO-03104834 A2 | 12/2003 |
| WO | WO-2004034646 A1 | 4/2004 |
| WO | WO-2004051962 A1 | 6/2004 |
| WO | WO-2005107187 A1 | 11/2005 |
| WO | WO-2005109781 A1 | 11/2005 |
| WO | WO-2006135289 A1 | 12/2006 |
| WO | WO-2007000757 | 1/2007 |
| WO | 2007013334 A1 | 2/2007 |
| WO | WO-2007021269 A1 | 2/2007 |
| WO | WO-2007033049 A2 | 3/2007 |
| WO | 2007098425 A1 | 8/2007 |
| WO | 2007140342 A2 | 12/2007 |
| WO | 2007140344 A2 | 12/2007 |
| WO | 2008027724 A1 | 3/2008 |
| WO | 2008087713 A1 | 7/2008 |
| WO | 2009040918 A1 | 4/2009 |
| WO | 2010120878 A2 | 10/2010 |
| WO | 2010126727 A2 | 11/2010 |
| WO | 2011003089 A1 | 1/2011 |
| WO | 2012096546 A2 | 7/2012 |

OTHER PUBLICATIONS

Co-pending U.S. Appl. No. 10/236,657, filed Sep. 6, 2002.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
Video Electronics Standards Association (VESA) Mobile Display Digital Interface Standard (MDDI), Jul. 2004.
Gentric., et al., "RTP Payload Format for MPEG-4 Streams", Internet Engineering Task Force, draft-ietf-avt-mpeg4-multisl-03.txt, Nov. 2001, pp. 13, 14, 25 and 33.
Handley, M. et al., "SDP: Session Description Protocol" Network Working Group, Request for Comments: 2327, Category: Standards Track. ISI/LBNL, Apr. 1998, pp. 1-42.
International Search Report and Written Opinion—PCT/US2012/022068—ISA/EPO—Jun. 22, 2012.
Schulzrinne, et al., "RTP: A Transport Protocol for Real-Time Applications", rfc3550.txt, Jul. 1, 2003, XP015009332, ISSN: 0000-0003.
Wenger et al., "RTP Payload Format for H.264 Video," Network Working Group, RFC 3984, Feb. 2005, 78 pp.
Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Brandenburg, et al., AVTCore, RTCP for inter-destination media synchronization, Internet Draft, draft-ietf-avtcore-idms-092.txt, Oct. 31, 2011.
Casner, S., et al., "Compressing IP/UDP/RTP Headers for Low-Speed Serial Links," IETF Network Working Group, RFC 2508 (Feb. 1999).
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012].
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC.2002.997206, vol. 4, Apr. 28, 2002, pp. 2036-2042, XP010589844 ISBN: 978-0-7803-7400-3.
Kwon E., et al., "An idle timeslot reuse scheme for IEEE 802.15.3 high-rate wireless personal area networks" Vehicular Technology Conference, 2005. VTC-2005-Fall. 2005 IEEE 62nd Dallas, TX,

(56) References Cited

OTHER PUBLICATIONS

USA Sep. 25-28, 2005, Piscataway, NJ, USA, IEEE, Sep. 25, 2005, pp. 715-719, XP010878576, ISBN: 0-7803-9152-7 section 1. Introduction.

McKnight et al. (TPRC 30th Research Conference on Communication, Information and Internet Policy, Aug. 2002) Virtual Markets in Wireless Grids: Peering Policy Obstacles, hereinafter referred to as McKnight, pp. 1 and 20.

Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol. MCD, No. V1. 1. 1, Dec. 1, 2010, XP014061814, section 5.

Miller B., et al., "Mapping salutation architecture APIs to Bluetooth service discovery layer," Bluetooth White Paper, [Online} pp. 1-25, Jul. 1, 1999, XP002511956.

Mitrea M., et al., "Novel approaches to 1-30 remote display representations: BiFS-based solution and its deployment within the FP7 MobiThin project", 87. MPEG Meeting; Feb. 2, 2009-Jun. 2, 2009; Lausanne; (Motion Picture Expert Group or ISO/IEC JTC1/SC29/WG11),, No. M16058, Jan. 29, 2009, XP030044655, sections 2 and 3.

MSDN DirectShow, retrieved Nov. 28, 2011 from: http://msdn.microsoft.com/en-us/library/dd375454(VS.85).aspx.

MSDN Windows Sockets 2, retrieved Nov. 28, 2011 from: http://msdn.microsoft.com/en-us/library/ms740673(VS.85).aspx.

Myers, et al: "Collaboration Using Multiple PDAS Connected to a PC," Proceedings of the ACM Conference on Computer Supported Cooperative Work (CSCW), Nov. 14, 1998, pp. 285-294, ISBN: 978-1-58113-009-6.

Nave I et al., "Games@large graphics streaming architecture", Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.

Nordbotten, N.A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.

Shoji Y., et al., "Research and Standardization activty for IEEE802.15.3c mmW WPAN: (2) Target applications and Usage Models", IEICE Tech. Rep., vol. 106, No. 555, RCS2006-279, pp. 179-182, Feb. 2007.

Yin Z., et al., "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.

International Preliminary Report on Patentability—PCT/US2013/020155, The International Bureau of WIPO—Geneva, Switzerland, Jul. 17, 2014.

DDJ., "Research on Windows Programming with Visual C++, Final Issue, Overcoming WIN32 Hook Processing in MFC Programming", Feb. 1996 issue (vol. 5, No. 2, No. 61 in all), Shoeisha Co., Ltd., Feb. 1, 1996, pp. 66-77.

\* cited by examiner

USER INPUT BACK CHANNEL FOR WIRELESS DISPLAYS

This application claims the benefit of
U.S. Provisional Application No. 61/435,194, filed 21 Jan. 2011;
U.S. Provisional Application No. 61/447,592, filed 28 Feb. 2011;
U.S. Provisional Application No. 61/448,312, filed 2 Mar. 2011;
U.S. Provisional Application No. 61/450,101, filed 7 Mar. 2011;
U.S. Provisional Application No. 61/467,535, filed 25 Mar. 2011;
U.S. Provisional Application No. 61/467,543, filed 25 Mar. 2011;
U.S. Provisional Application No. 61/514,863, filed 3 Aug. 2011; and
U.S. Provisional Application No. 61/544,461, filed 7 Oct. 2011;
the entire contents each of which are incorporated herein by reference in their entirety.

TECHNICAL FIELD

This disclosure relates to techniques for transmitting data between a wireless source device and a wireless sink device.

BACKGROUND

Wireless display (WD) or Wi-Fi Display (WFD) systems include a wireless source device and one or more wireless sink devices. The source device and each of the sink devices may be either mobile devices or wired devices with wireless communication capabilities. One or more of the source device and the sink devices may, for example, include mobile telephones, portable computers with wireless communication cards, personal digital assistants (PDAs), portable media players, or other such devices with wireless communication capabilities, including so-called "smart" phones and "smart" pads or tablets, e-readers, or any type of wireless display, video gaming devices, or other types of wireless communication devices. One or more of the source device and the sink devices may also include wired devices such as televisions, desktop computers, monitors, projectors, and the like, that include communication capabilities.

The source device sends media data, such as audio video (AV) data, to one or more of the sink devices participating in a particular media share session. The media data may be played back at both a local display of the source device and at each of the displays of the sink devices. More specifically, each of the participating sink devices renders the received media data on its screen and audio equipment.

SUMMARY

This disclosure generally describes a system where a wireless sink device can communicate with a wireless sink device. As part of a communication session, a wireless source device can transmit audio and video data to the wireless sink device, and the wireless sink device can transmit user inputs received at the wireless sink device back to the wireless source device. In this manner, a user of the wireless sink device can control the wireless source device and control the content that is being transmitted from the wireless source device to the wireless sink device.

In one example, a method of transmitting user input data from a wireless sink device to a wireless source device includes obtaining user input data at the wireless sink device; generating a data packet header, wherein the data packet header comprises a field to identify an input category of the user input data; generating a data packet comprising the data packet header and payload data; and, transmitting the data packet to the wireless source device.

In another example, a wireless sink device is configured to transmit user input data to a wireless source device. The wireless sink device includes a memory storing instructions; one or more processors configured to execute the instructions, wherein upon execution of the instructions the one or more processors cause obtaining user input data at the wireless sink device; generating a data packet header, wherein the data packet header comprises a field to identify an input category of the user input data; and, generating a data packet comprising the data packet header and payload data. The wireless sink device also includes a transport unit to transmit the data packet to the wireless source device.

In another example, a computer-readable storage medium stores instructions that upon execution by one or more processors cause the one or more processors to perform a method of transmitting user input data from a wireless sink device to a wireless source device. The method includes obtaining user input data at the wireless sink device; generating a data packet header, wherein the data packet header comprises a field to identify an input category of the user input data; generating a data packet comprising the data packet header and payload data; and, transmitting the data packet to the wireless source device.

In another example, a wireless sink device is configured to transmit user input data to a wireless source device. The wireless sink device includes means for obtaining user input data at the wireless sink device; means for generating a data packet header, wherein the data packet header comprises a field to identify an input category of the user input data; means for generating a data packet comprising the data packet header and payload data; and, means for transmitting the data packet to the wireless source device.

In another example, a method of receiving user input data from a wireless sink device at a wireless source device includes receiving a data packet comprising a data packet header and payload data; parsing the data packet header to determine an input category associated with user input data contained in the payload data; and, processing the payload data based on the determined input category.

In another example, a wireless source device is configured to receive user input data from a wireless sink device. The wireless source device includes a transport unit to receive a data packet comprising a data packet header and payload data; a memory storing instructions; one or more processors configured to execute the instructions, wherein upon execution of the instructions the one or more processors cause parsing the data packet header to determine an input category associated with user input data contained in the payload data and processing the payload data based on the determined input category.

In another example, a computer-readable storage medium stores instructions that upon execution by one or more processors cause the one or more processors to perform a method of receiving user input data from a wireless source device at a wireless sink device. The method includes receiving a data packet comprising a data packet header and payload data; parsing the data packet header to determine an input category associated with user input data contained in the payload data; and processing the payload data based on the determined input category.

In another example, a wireless source device is configured to receive user input data from a wireless sink device. The wireless source device includes means for receiving a data packet comprising a data packet header and payload data; means for parsing the data packet header to determine an input category associated with user input data contained in the payload data; and, means for processing the payload data based on the determined input category.

DETAILED DESCRIPTION

This disclosure generally describes a system where a wireless sink device can communicate with a wireless sink device. As part of a communication session, a wireless source device can transmit audio and video data to the wireless sink device, and the wireless sink device can transmit user inputs received at the wireless sink device back to the wireless source device. In this manner, a user of the wireless sink device can control the wireless source device and control the content that is being transmitted from the wireless source device to the wireless sink device.

Figure 1A:
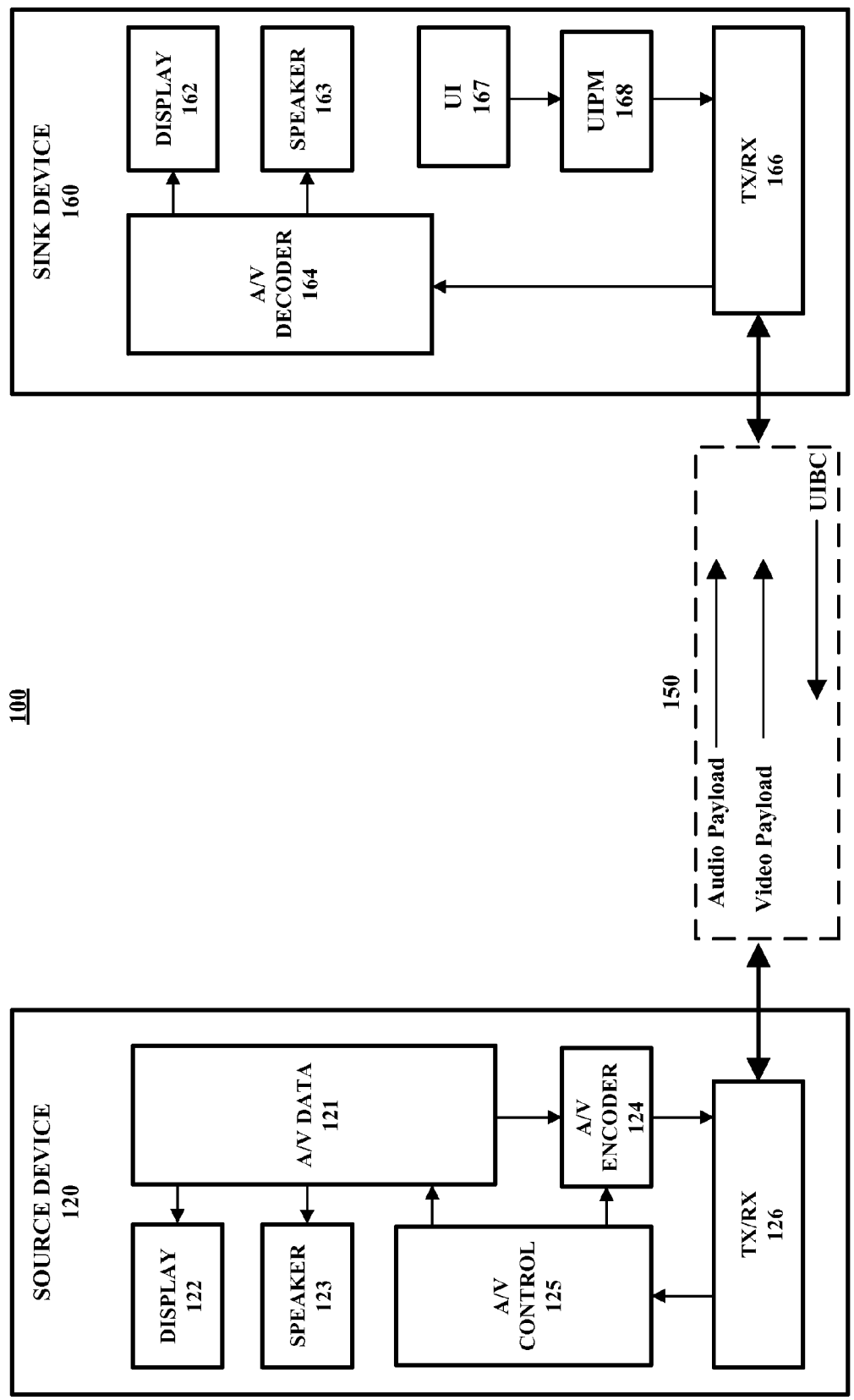
FIG. 1A is a block diagram illustrating an example of a source/sink system that may implement techniques of this disclosure.

FIG. 1A is a block diagram illustrating an exemplary source/sink system 100 that may implement one or more of the techniques of this disclosure. As shown in FIG. 1A, system 100 includes source device 120 that communicates with sink device 160 via communication channel 150. Source device 120 may include a memory that stores audio/video (A/V) data 121, display 122, speaker 123, audio/video encoder 124 (also referred to as encoder 124), audio/video control module 125, and transmitter/receiver (TX/RX) unit 126. Sink device 160 may include display 162, speaker 163, audio/video decoder 164 (also referred to as decoder 164), transmitter/receiver unit 166, user input (UI) device 167, and user input processing module (UIPM) 168. The illustrated components constitute merely one example configuration for source/sink system 100. Other configurations may include fewer components than those illustrated or may include additional components than those illustrated.

In the example of FIG. 1A, source device 120 can display the video portion of audio/video data 121 on display 122 and can output the audio portion of audio/video data 121 on speaker 123. Audio/video data 121 may be stored locally on source device 120, accessed from an external storage medium such as a file server, hard drive, external memory, Blu-ray disc, DVD, or other physical storage medium, or may be streamed to source device 120 via a network connection such as the internet. In some instances audio/video data 121 may be captured in real-time via a camera and microphone of source device 120. Audio/video data 121 may include multimedia content such as movies, television shows, or music, but may also include real-time content generated by source device 120. Such real-time content may for example be produced by applications running on source device 120, or video data captured, e.g., as part of a video telephony session. As will be described in more detail, such real-time content may in some instances include a video frame of user input options available for a user to select. In some instances, audio/video data 121 may include video frames that are a combination of different types of content, such as a video frame of a movie or TV program that has user input options overlaid on the frame of video.

In addition to rendering audio/video data 121 locally via display 122 and speaker 123, audio/video encoder 124 of source device 120 can encode audio/video data 121, and transmitter/receiver unit 126 can transmit the encoded data over communication channel 150 to sink device 160. Transmitter/receiver unit 166 of sink device 160 receives the encoded data, and audio/video decoder 164 decodes the encoded data and outputs the decoded data via display 162 and speaker 163. In this manner, the audio and video data being rendered by display 122 and speaker 123 can be simultaneously rendered by display 162 and speaker 163. The audio data and video data may be arranged in frames, and the audio frames may be time-synchronized with the video frames when rendered.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Many other types of proprietary or standardized compression techniques may also be used. Generally speaking, audio/video decoder 164 is configured to perform the reciprocal coding operations of audio/video encoder 124. Although not shown in FIG. 1A, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

As will be described in more detail below, A/V encoder 124 may also perform other encoding functions in addition to implementing a video compression standard as described above. For example, A/V encoder 124 may add various types of metadata to A/V data 121 prior to A/V data 121 being transmitted to sink device 160. In some instances, A/V data 121 may be stored on or received at source device 120 in an encoded form and thus not require further compression by A/V encoder 124.

Although, FIG. 1A shows communication channel 150 carrying audio payload data and video payload data separately, it is to be understood that in some instances video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC). Thus, each of source device 120 and sink device 160 may comprise specialized machines configured to execute one or more of the techniques of this disclosure.

Display 122 and display 162 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the displays 122 and 162 may each be emissive displays or transmissive displays. Display 122 and display 162 may also be touch displays such that they are simultaneously both input devices and display devices. Such touch displays may be capacitive, resistive, or other type of touch panel that allows a user to provide user input to the respective device.

Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 120 and sink device 160 may be similar devices, e.g., both being smartphones, tablet computers, or the like. In this case, one device may operate as the source and the other may operate as the sink. These rolls may even be reversed in subsequent communication sessions. In still other cases, the source device may comprise a mobile device, such as a smartphone, laptop or tablet computer, and the sink device may comprise a more stationary device (e.g., with an AC power cord), in which case the source device may deliver audio and video data for presentation to a large crowd via the sink device.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to Wi-Fi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link. Source device 120 and sink device 160 may communicate over communication channel 150 using a communications protocol such as a standard from the IEEE 802.11 family of standards. Source device 120 and sink device 160 may, for example, communicate according to the Wi-Fi Direct standard, such that source device 120 and sink device 160 communicate directly with one another without the use of an intermediary such as a wireless access points or so called hotspot. Source device 120 and sink device 160 may also establish a tunneled direct link setup (TLDS) to avoid or reduce network congestion. The techniques of this disclosure may at times be described with respect to Wi-Fi, but it is contemplated that aspects of these techniques may also be compatible with other communication protocols. By way of example and not limitation, the wireless communication between source device 120 and sink device may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA. WiFi Direct and TDLS are intended to setup relatively short-distance communication sessions. Relatively short distance in this context may refer to, for example, less than 70 meters, although in a noisy or obstructed environment the distance between devices may be even shorter, such as less than 35 meters.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. UIPM 168 formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module 125 parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120. Examples of the types of commands a user of sink device 160 may transmit to source device 120 include commands for rewinding, fast forwarding, pausing, and playing audio and video data, as well as commands for zooming, rotating, scrolling, and so on. Users may also make selections, from a menu of options for example, and transmit the selection back to source device 120.

Additionally, users of sink device 160 may be able to launch and control applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices. For example, source device 120 may be a smartphone with a large amount of memory and high-end processing capabilities. A user of source device 120 may use the smartphone in all the settings and situations smartphones are typically used. When watching a movie, however, the user may wish to watch the movie on a device with a bigger display screen, in which case sink device 160 may be a tablet computer or even larger display device or television. When wanting to send or respond to email, the user may wish to use a device with a keyboard, in which case sink device 160 may be a laptop. In both instances, the bulk of the processing may still be performed by source device 120 (a smartphone in this example) even though the user is interacting with a sink device. In this particular operating context, due to the bulk of the processing being performed by source device 120, sink device 160 may be a lower cost device with fewer resources than if sink device 160 were being asked to do the processing being done by source device 120. Both the source device and the sink device may be capable of receiving user input (such as touch screen commands) in some examples, and the techniques of this disclosure may facilitate two way interaction by negotiating and or identifying the capabilities of the devices in any given session.

In some configuration, A/V control module 125 may be an operating system process being executed by the operating system of source device 125. In other configurations, however, A/V control module 125 may be a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

Source device 120 can respond to user inputs applied at wireless sink device 160. In such an interactive application setting, the user inputs applied at wireless sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. In one example, the OSI communication includes seven layers (1—physical, 2—data link, 3—network, 4—transport, 5—session, 6—presentation, and 7—application). In this example, being above transport layer refers to layers 5, 6, and 7. To promote reliable transmission and in sequence delivery of data packets containing user input data, UIBC may be configured run on top of other packet-based communication protocols such as the transmission control protocol/internet protocol (TCP/IP) or the user datagram protocol (UDP). UDP and TCP can operate in parallel in the OSI layer architecture. TCP/IP can enable sink device 160 and source device 120 to implement retransmission techniques in the event of packet loss.

In some cases, there may be a mismatch between the user input interfaces located at source device 120 and sink device 160. To resolve the potential problems created by such a mismatch and to promote a good user experience under such circumstances, user input interface capability negotiation may occur between source device 120 and sink device 160 prior to establishing a communication session or at various times throughout a communication session. As part of this negotiation process, source device 120 and sink device 160 can agree on a negotiated screen resolution. When sink device 160 transmits coordinate data associated with a user input, sink device 160 can scale coordinate data obtained from display 162 to match the negotiated screen resolution. In one example, if sink device 160 has a 1280×720 resolution and source device 120 has a 1600×900 resolution, the devices may, for example, use 1280×720 as their negotiated resolution. The negotiated resolution may be chosen based on a resolution of sink device 160, although a resolution of source device 120 or some other resolution may also be used. In the example where the sink device of 1280×720 is used, sink device 160 can scale obtained x-coordinates by a factor of 1600/1280 prior to transmitting the coordinates to source device 120, and likewise, sink device 160 can scale obtained y-coordinates by 900/720 prior to transmitting the coordinates to source device 120. In other configurations, source device 120 can scale the obtained coordinates to the negotiated resolution. The scaling may either increase or decrease a coordinate range based on whether sink device 160 uses a higher resolution display than source device 120, or vice versa.

Additionally, in some instances, the resolution at sink device 160 may vary during a communication session, potentially creating a mismatch between display 122 and display 162. In order to improve the user experience and to ensure proper functionality, source/sink system 100 may implement techniques for reducing or preventing user interaction mismatch by implementing techniques for screen normalization. Display 122 of source device 120 and display 162 of sink device 160 may have different resolutions and/or different aspects ratios. Additionally, in some settings, a user of sink device 160 may have the ability to resize a display window for the video data received from source device 120 such that the video data received from source device 120 is rendered in a window that covers less than all of display 162 of sink device 160. In another example setting, a user of sink device 160 may have the option of viewing content in either a landscape mode or a portrait mode, each of which has unique coordinates and different aspect ratios. In such situations, coordinates associated with a user input received at sink device 160, such as the coordinate for where a mouse click or touch event occurs, may not able to be processed by source device 120 without modification to the coordinates. Accordingly, techniques of this disclosure may include mapping the coordinates of the user input received at sink device 160 to coordinates associated with source device 120. This mapping is also referred to as normalization herein, and as will be explained in greater detail below, this mapping can be either sink-based or source-based.

User inputs received by sink device 160 can be received by UI module 167, at the driver level for example, and passed to the operating system of sink device 160. The operating system on sink device 160 can receive coordinates ($x_{SINK}$, $y_{SINK}$) associated with where on a display surface a user input occurred. In this example, ($x_{SINK}$, $y_{SINK}$) can be coordinates of display 162 where a mouse click or a touch event occurred. The display window being rendered on display 162 can have an x-coordinate length ($L_{DW}$) and a y-coordinate width ($W_{DW}$) that describe the size of the display window. The display window can also have an upper left corner coordinate ($a_{DW}$, $b_{DW}$) that describes the location of the display window. Based on $L_{DW}$, $W_{DW}$, and the upper left coordinate ($a_{DW}$, $b_{DW}$), the portion of display 162 covered by the display window can be determined. For example, an upper right corner of the display window can be located at coordinate ($a_{DW}+L_{DW}$, $b_{DW}$), a lower left corner of the display window can be located at coordinate ($a_{DW}$, $b_{DW}+W_{DW}$), and a lower right corner of the display window can be located at coordinate ($a_{DW}+L_{DW}$, $b_{DW}+W_{DW}$). Sink device 160 can process an input as a UIBC input if the input is received at a coordinate within the display window. In other words, an input with associated coordinates ($x_{SINK}$, $y_{SINK}$) can be processed as a UIBC input if the following conditions are met:

$$a_{DW} \leq x_{SINK} \leq a_{DW}+L_{DW} \qquad (1)$$

$$b_{DW} \leq y_{SINK} \leq b_{DW}+W_{DW} \qquad (2)$$

After determining that a user input is a UIBC input, coordinates associated with the input can be normalized by UIPM 168 prior to being transmitted to source device 120. Inputs that are determined to be outside the display window can be processed locally by sink device 160 as non-UIBC inputs.

As mentioned above, the normalization of input coordinates can be either sourced-based or sink-based. When implementing sink-based normalization, source device 120 can send a supported display resolution ($L_{SRC}$, $W_{SRC}$) for display 122, either with video data or independently of video data, to sink device 160. The supported display resolution may, for example, be transmitted as part of a capability negotiation session or may be transmitted at another time during a communication session. Sink device 160 can determine a display resolution ($L_{SINK}$, $W_{SINK}$) for display 162, the display window resolution ($L_{DW}$, $W_{DW}$) for the window displaying the content received from source device 120, and the upper left corner coordinate ($a_{DW}$, $b_{DW}$) for the display window. As described above, when a coordinate ($x_{SINK}$, $y_{SINK}$) corresponding to a user input is determined to be within the display window, the operating system of sink device 160 can map the coordinate ($x_{SINK}$, $y_{SINK}$) to source coordinates ($x_{SRC}$, $y_{SRC}$) using conversion functions. Example conversion functions for converting ($x_{SINK}$, $y_{SINK}$) to ($x_{SRC}$, $y_{SRC}$) can be as follows:

$$x_{SRC}=(x_{SINK}-a_{DW})*(L_{SRC}/L_{DW}) \qquad (3)$$

$$y_{SRC}=(y_{SINK}-b_{DW})*(W_{SRC}/W_{DW}) \qquad (4)$$

Thus, when transmitting a coordinate corresponding to a received user input, sink device 160 can transmit the coordinate ($x_{SRC}$, $y_{SRC}$) for a user input received at ($x_{SINK}$, $y_{SINK}$). As will be described in more detail below, coordinate ($x_{SRC}$, $y_{SRC}$) may, for example, be transmitted as part of a data packet used for transmitting user input received at sink device 160 to source device 120 over the UIBC. Throughout other portions of this disclosure, where input coordinates are described as being included in a data packet, those coordinates can be converted to source coordinates as described above in instances where source/sink system 100 implements sink-based normalization.

When source/sink system 100 implements sourced-based normalization, for user inputs determined to by UIBC inputs as opposed to local inputs (i.e. within a display window as opposed to outside a display window), the calculations above can be performed at source device 120 instead of sink device 160. To facilitate such calculations, sink device 160 can transmit to source device 120 values for $L_{DW}$, $W_{DW}$, and location information for the display window (e.g. $a_{DW}$, $b_{DW}$), as well as coordinates for ($x_{SINK}$, $y_{SINK}$). Using these transmitted values, source device 120 can determine values for ($x_{SRC}$, $y_{SRC}$) according to equations 3 and 4 above.

In other implementations of sink-based normalization, sink device 160 can transmit coordinates ($x_{DW}$, $y_{DW}$) for a user input that describe where within the display window a user input event occurs as opposed to where on display 162 the user input even occurs. In such an implementation, coordinates ($x_{DW}$, $y_{DW}$) can be transmitted to source device 120 along with values for ($L_{DW}$, $W_{DW}$). Based on these received values, source device 120 can determine ($x_{SRC}$, $y_{SRC}$) according to the following conversion functions:

$$x_{SRC}=x_{DW}*(L_{SRC}/L_{DW}) \qquad (5)$$

$$y_{SRC}=y_{DW}*(W_{SRC}/W_{DW}) \qquad (6)$$

Sink device 160 can determine $x_{DW}$ and $y_{DW}$ based on the following functions:

$$x_{DW}=x_{SINK}-a_{DW} \qquad (7)$$

$$y_{DW}=y_{SINK}-b_{DW} \qquad (8)$$

When this disclosure describes transmitting coordinates associated with a user input, in a data packet for example, the transmission of these coordinates may include sink-based or source-based normalization as described above, and/or may include any additional information necessary for performing the sink-based or source-based normalization.

The UIBC may be designed to transport various types of user input data, including cross-platform user input data. For example, source device 120 may run the iOS® operating system, while sink device 160 runs another operating system such as Android® or Windows®. Regardless of platform, UIPM 168 can encapsulate received user input in a form understandable to A/V control module 125. A number of different types of user input formats may be supported by the UIBC so as to allow many different types of source and sink devices to exploit the protocol regardless of whether the source and sink devices operate on different platforms. Generic input formats may be defined, and platform specific input formats may both be supported, thus providing flexibility in the manner in which user input can be communicated between source device 120 and sink device 160 by the UIBC.

In the example of FIG. 1A, source device 120 may comprise a smartphone, tablet computer, laptop computer, desktop computer, Wi-Fi enabled television, or any other device capable of transmitting audio and video data. Sink device 160 may likewise comprise a smartphone, tablet computer, laptop computer, desktop computer, Wi-Fi enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device.

In this disclosure, the term source device is generally used to refer to the device that is transmitting audio/video data, and the term sink device is generally used to refer to the device that is receiving the audio/video data from the source device. In many cases, source device 120 and sink device 160 may be similar or identical devices, with one device operating as the source and the other operating as the sink. Moreover, these rolls may be reversed in different communication sessions. Thus, a sink device in one communication session may become a source device in a subsequent communication session, or vice versa.

Figure 1B:
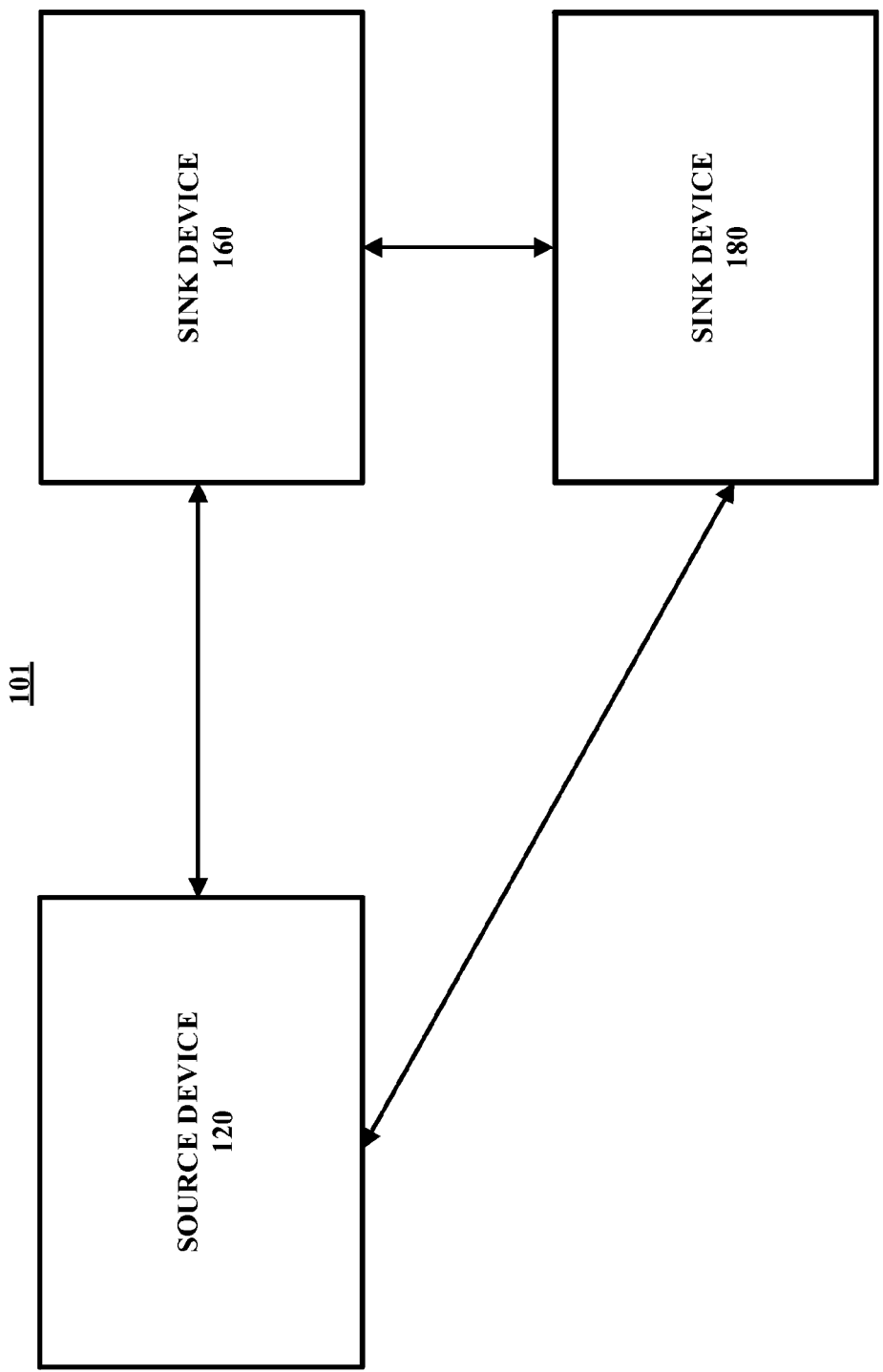
FIG. 1B is a block diagram illustrating an example of a source/sink system with two sink devices.

FIG. 1B is a block diagram illustrating an exemplary source/sink system 101 that may implement techniques of this disclosure. Source/sink system 101 includes source device 120 and sink device 160, each of which may function and operate in the manner described above for FIG. 1A. Source/sink system 101 further includes sink device 180. In a similar manner to sink device 160 described above, sink device 180 may receive audio and video data from source device 120 and transmit user commands to source device 120 over an established UIBC. In some configurations, sink device 160 and sink device 180 may operate independently of one another, and audio and video data output at source device 120 may be simultaneously output at sink device 160 and sink device 180. In alternate configurations, sink device 160 may be a primary sink device and sink device 180 may be a secondary sink device. In such an example configuration, sink device 160 and sink device 180 may be coupled, and sink device 160 may display video data while sink device 180 outputs corresponding audio data. Additionally, in some configurations, sink device 160 may output transmitted video data only while sink device 180 outputs transmitted audio data only.

Figure 2:
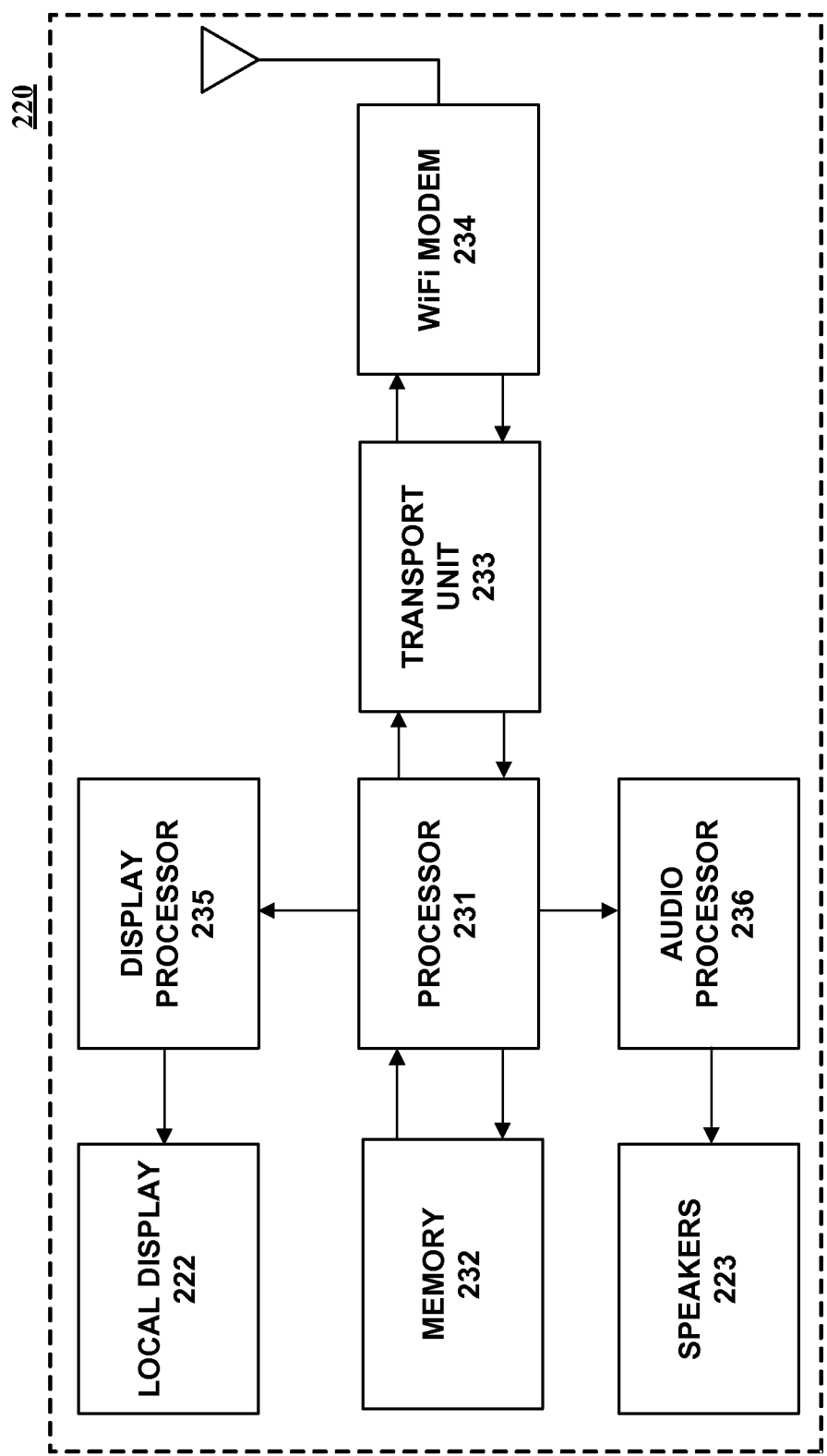
FIG. 2 shows an example of a source device that may implement techniques of this disclosure.

FIG. 2 is a block diagram showing one example of a source device 220. Source device 220 may be a device similar to source device 120 in FIG. 1A and may operate in the same manner as source device 120. Source device 220 includes local display 222, local speaker 223, processors 231, memory 232, transport unit 233, and wireless modem 234. As shown in FIG. 2, source device 220 may include one or more processors (i.e. processor 231) that encode and/or decode A/V data for transport, storage, and display. The A/V data may for example be stored at memory 232. Memory 232 may store an entire A/V file, or may comprise a smaller buffer that simply stores a portion of an A/V file, e.g., streamed from another device or source. Transport unit 233 may process encoded A/V data for network transport. For example, encoded A/V data may be processed by processor 231 and encapsulated by transport unit 233 into Network Access Layer (NAL) units for communication across a network. The NAL units may be sent by wireless modem 234 to a wireless sink device via a network connection. Wireless modem 234 may, for example, be a Wi-Fi modem configured to implement one of the IEEE 802.11 family of standards.

Source device 220 may also locally process and display A/V data. In particular display processor 235 may process video data to be displayed on local display 222, audio processor 236 may process audio data for output on speaker 223.

As described above with reference to source device 120 of FIG. 1A, source device 220 may also receive user input commands from a sink device. In this manner, wireless modem 234 of source device 220 receives encapsulated data packets, such as NAL units, and sends the encapsulated data units to transport unit 233 for decapsulation. For instance, transport unit 233 may extract data packets from the NAL units, and processor 231 can parse the data packets to extract the user input commands. Based on the user input commands, processor 231 can adjust the encoded A/V data being transmitted by source device 220 to a sink device. In this manner, the functionality described above in reference to A/V control module 125 of FIG. 1A may be implemented, either fully or partially, by processor 231.

Processor 231 of FIG. 2 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Memory 232 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 232 may additionally store instructions and program code that are executed by processor 231 as part of performing the various techniques described in this disclosure.

Figure 3:
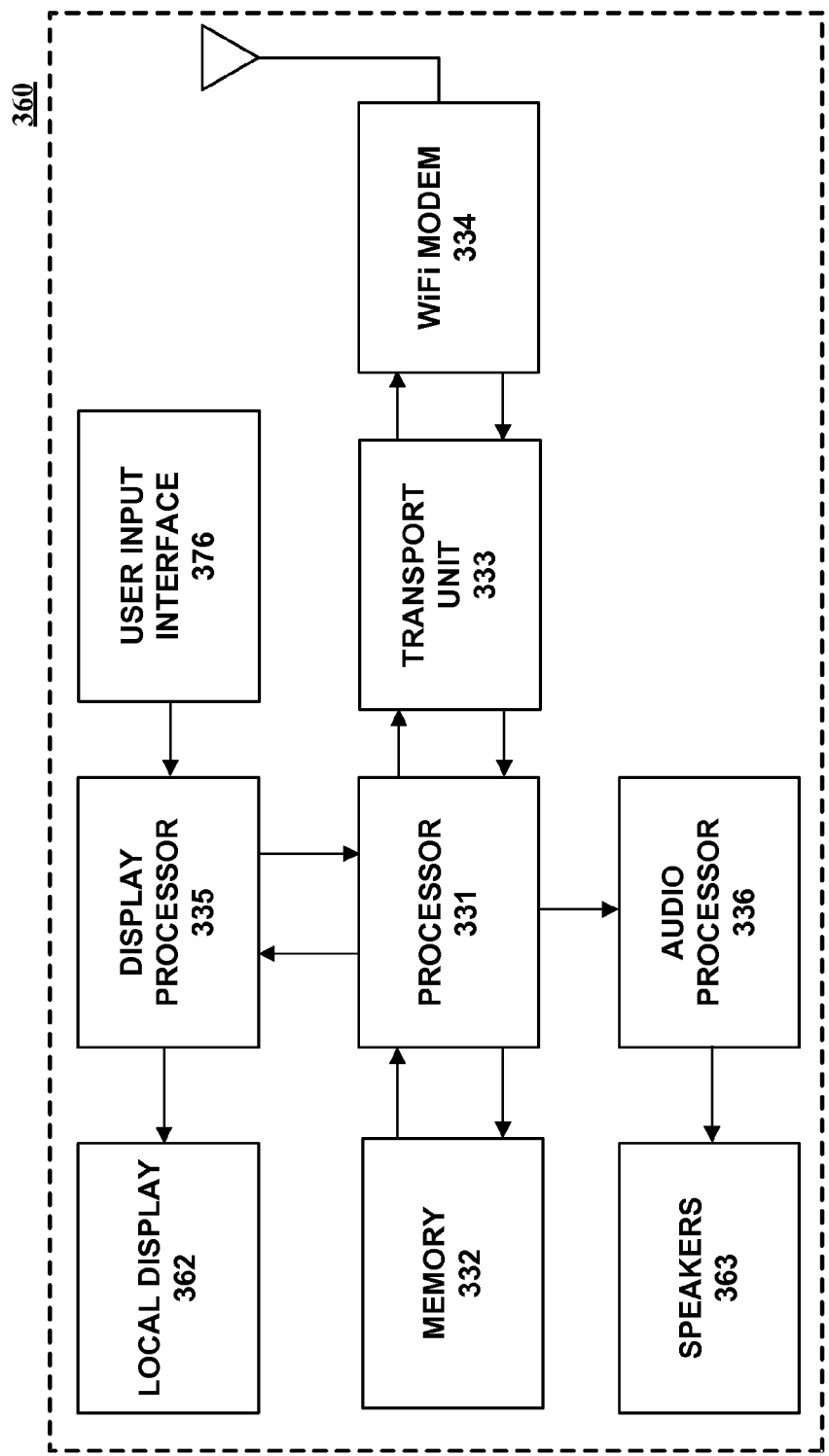
FIG. 3 shows an example of a sink device that may implement techniques of this disclosure.

FIG. 3 shows an example of a sink device 360. Sink device 360 may be a device similar to sink device 160 in FIG. 1A and may operate in the same manner as sink device 160. Sink device 360 includes one or more processors (i.e. processor 331), memory 332, transport unit 333, wireless modem 334, display processor 335, local display 362, audio processor 336, speaker 363, and user input interface 376. Sink device 360 receives at wireless modem 334 encapsulated data units sent from a source device. Wireless modem 334 may, for example, be a Wi-Fi modem configured to implement one more standards from the IEEE 802.11 family of standards. Transport unit 333 can decapsulate the encapsulated data units. For instance, transport unit 333 may extract encoded video data from the encapsulated data units and send the encoded A/V data to processor 331 to be decoded and rendered for output. Display processor 335 may process decoded video data to be displayed on local display 362, and audio processor 336 may process decoded audio data for output on speaker 363.

In addition to rendering audio and video data, wireless sink device 360 can also receive user input data through user input interface 376. User input interface 376 can represent any of a number of user input devices included but not limited to a touch display interface, a keyboard, a mouse, a voice command module, gesture capture device (e.g., with camera-based input capturing capabilities) or any other of a number of user input devices. User input received through user input interface 376 can be processed by processor 331. This processing may include generating data packets that include the received user input command in accordance with the techniques described in this disclosure. Once generated, transport unit 333 may process the data packets for network transport to a wireless source device over a UIBC.

Processor 331 of FIG. 3 may comprise one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 232 may comprise a computer-readable storage medium for storing audio/video data, as well as other kinds of data. Memory 332 may additionally store instructions and program code that are executed by processor 331 as part of performing the various techniques described in this disclosure.

Figure 4:
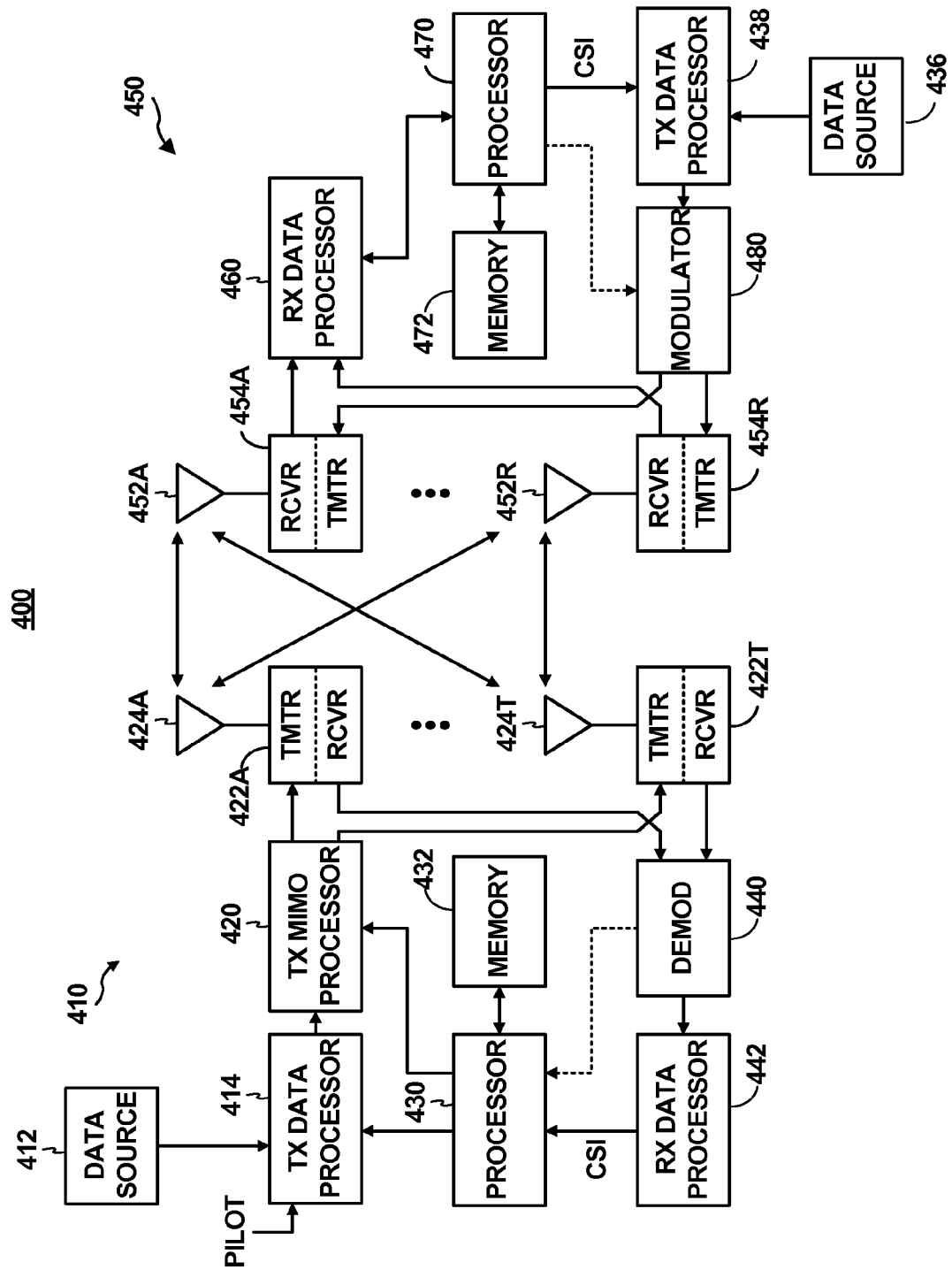
FIG. 4 shows a block diagram of a transmitter system and a receiver system that may implement techniques of this disclosure.

FIG. 4 shows a block diagram of an example transmitter system 410 and receiver system 450, which may be used by transmitter/receiver 126 and transmitter/receiver 166 of FIG. 1A for communicating over communication channel 150. At transmitter system 410, traffic data for a number of data streams is provided from a data source 412 to a transmit (TX) data processor 414. Each data stream may be transmitted over a respective transmit antenna. TX data processor 414 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 4, the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 430 which may be coupled with memory 432.

The modulation symbols for the data streams are then provided to a TX MIMO processor 420, which may further process the modulation symbols (e.g., for OFDM). TX MIMO processor 420 can then provide $N_T$ modulation symbol streams to $N_T$ transmitters (TMTR) 422a through 422t. In certain aspects, TX MIMO processor 420 applies beamforming weights to the symbols of the data streams and to the antenna from which the symbol is being transmitted.

Each transmitter 422 may receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 422a through 422t are then transmitted from $N_T$ antennas 424a through 424t, respectively.

At receiver system 450, the transmitted modulated signals are received by $N_R$ antennas 452a through 452r and the received signal from each antenna 452 is provided to a respective receiver (RCVR) 454a through 454r. Receiver 454 conditions (e.g., filters, amplifies, and downconverts) a respective received signal, digitizes the conditioned signal to provide samples, and further processes the samples to provide a corresponding "received" symbol stream.

A receive (RX) data processor 460 then receives and processes the $N_R$ received symbol streams from $N_R$ receivers 454 based on a particular receiver processing technique to provide $N_T$ "detected" symbol streams. The RX data processor 460 then demodulates, deinterleaves and decodes each detected symbol stream to recover the traffic data for the data stream. The processing by RX data processor 460 is complementary to that performed by TX MIMO processor 420 and TX data processor 414 at transmitter system 410.

A processor 470 that may be coupled with a memory 472 periodically determines which pre-coding matrix to use. The reverse link message may comprise various types of information regarding the communication link and/or the received data stream. The reverse link message is then processed by a TX data processor 438, which also receives traffic data for a number of data streams from a data source 436, modulated by a modulator 480, conditioned by transmitters 454a through 454r, and transmitted back to transmitter system 410.

At transmitter system 410, the modulated signals from receiver system 450 are received by antennas 424, conditioned by receivers 422, demodulated by a demodulator 440, and processed by a RX data processor 442 to extract the reserve link message transmitted by the receiver system 450. Processor 430 then determines which pre-coding matrix to use for determining the beamforming weights then processes the extracted message.

Figure 5A:
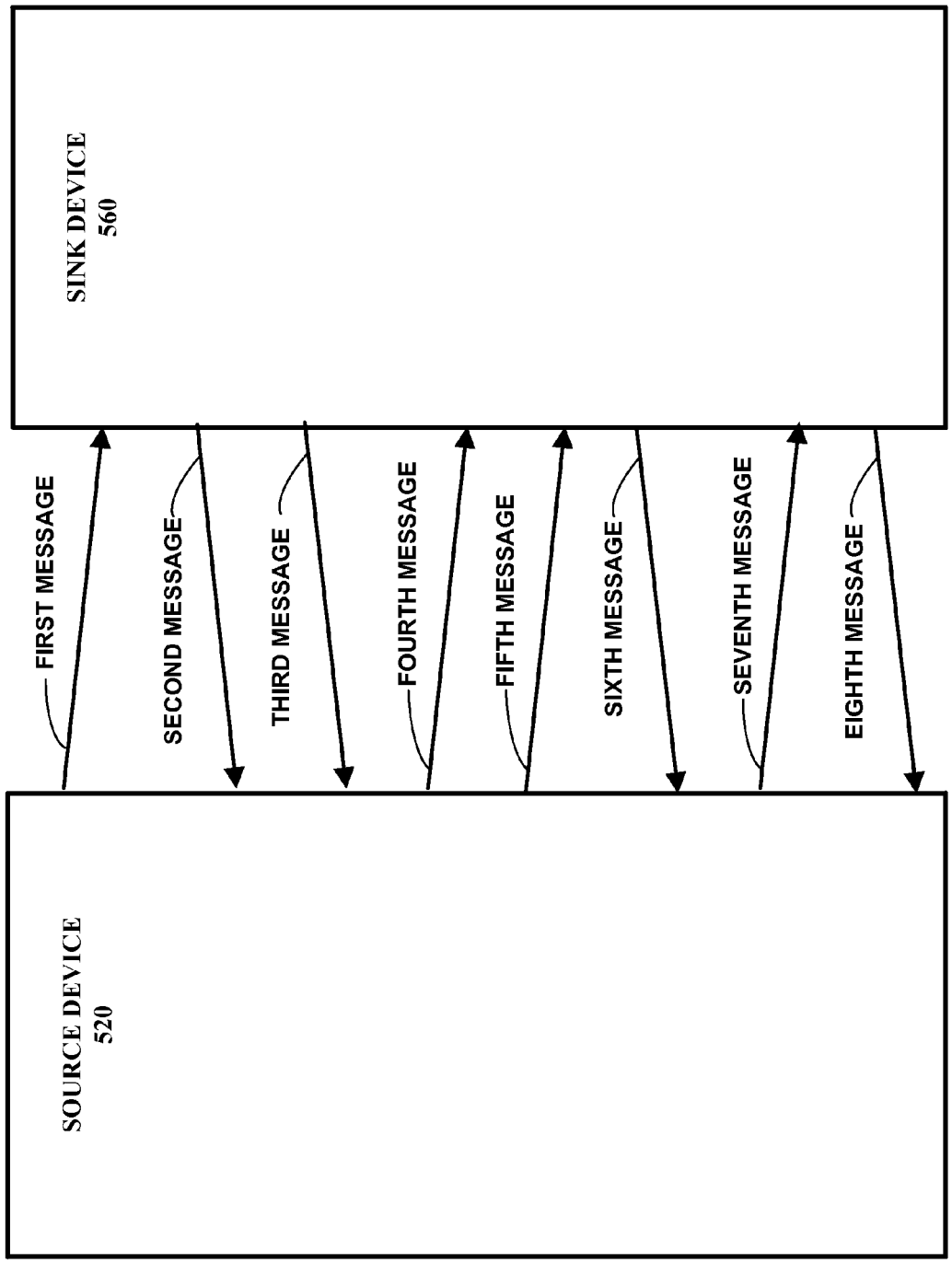
FIGS. 5A and 5B show example message transfer sequences for performing capability negotiations according to techniques of this disclosure.

FIG. 5A is a block diagram illustrating an example message transfer sequence between a source device 520 and a sink device 560 as part of a capabilities negotiations session. Capability negotiation may occur as part of a larger communication session establishment process between source device 520 and sink device 560. This session may, for example, be established with Wi-Fi Direct or TDLS as the underlying connectivity standard. After establishing the Wi-Fi Direct or TDLS session, sink device 560 can initiate a TCP connection with source device 520. As part of establishing the TCP connection, a control port running a real time streaming protocol (RTSP) can be established to manage a communication session between source device 520 and sink device 560.

Source device 520 may generally operate in the same manner described above for source device 120 of FIG. 1A, and sink device 560 may generally operate in the same manner described above for sink device 160 of FIG. 1A. After source device 520 and sink device 560 establish connectivity, source device 520 and sink device 560 may determine the set of parameters to be used for their subsequent communication session as part of a capability negotiation exchange.

Source device 520 and sink device 560 may negotiate capabilities through a sequence of messages. The messages may, for example, be real time streaming protocol (RTSP) messages. At any stage of the negotiations, the recipient of an RTSP request message may respond with an RTSP response that includes an RTSP status code other than RTSP OK, in which case, the message exchange might be retried with a different set of parameters or the capability negotiation session may be ended.

Source device 520 can send a first message (RTSP OPTIONS request message) to sink device 560 in order to determine the set of RTSP methods that sink device 560 supports. On receipt of the first message from source device 520, sink device 560 can respond with a second message (RTSP OPTIONS response message) that lists the RTSP methods supported by sink 560. The second message may also include a RTSP OK status code.

After sending the second message to source device 520, sink device 560 can send a third message (RTSP OPTIONS request message) in order to determine the set of RTSP methods that source device 520 supports. On receipt of the third message from sink device 560, source device 520 can respond with a fourth message (RTSP OPTIONS response message) that lists the RTSP methods supported by source device 520. The fourth message can also include RTSP OK status code.

After sending the fourth message, source device 520 can send a fifth message (RTSP GET_PARAMETER request message) to specify a list of capabilities that are of interest to source device 520. Sink device 560 can respond with a sixth message (an RTSP GET_PARAMETER response message). The sixth message may contain an RTSP status code. If the RTSP status code is OK, then the sixth message can also include response parameters to the parameter specified in the fifth message that are supported by sink device 560. Sink device 560 can ignore parameters in the fifth message that sink device 560 does not support.

Based on the sixth message, source 520 can determine the optimal set of parameters to be used for the communication session and can send a seventh message (an RTSP SET_PARAMETER request message) to sink device 560. The seventh message can contain the parameter set to be used during the communication session between source device 520 and sink device 560. The seventh message can include the wfd-presentation-url that describes the Universal Resource Identifier (URI) to be used in the RTSP Setup request in order to setup the communication session. The wfd-presentation-url specifies the URI that sink device 560 can use for later messages during a session establishment exchange. The wfd-url0 and wfd-url1 values specified in this parameter can correspond to the values of rtp-port0 and rtp-port1 values in the wfd-client-rtp-ports in the seventh message. RTP in this instance generally refers to the real-time protocol which can run on top of the UDP.

Upon receipt of the seventh message, sink device 560 can respond with an eighth message with an RTSP status code indicating if setting the parameters as specified in the seventh message was successful. As mentioned above, the roles or source device and sink device may reverse or change in different sessions. The order of the messages that set up the communication session may, in some cases, define the device that operates as the source and define the device that operates as the sink.

Figure 5B:
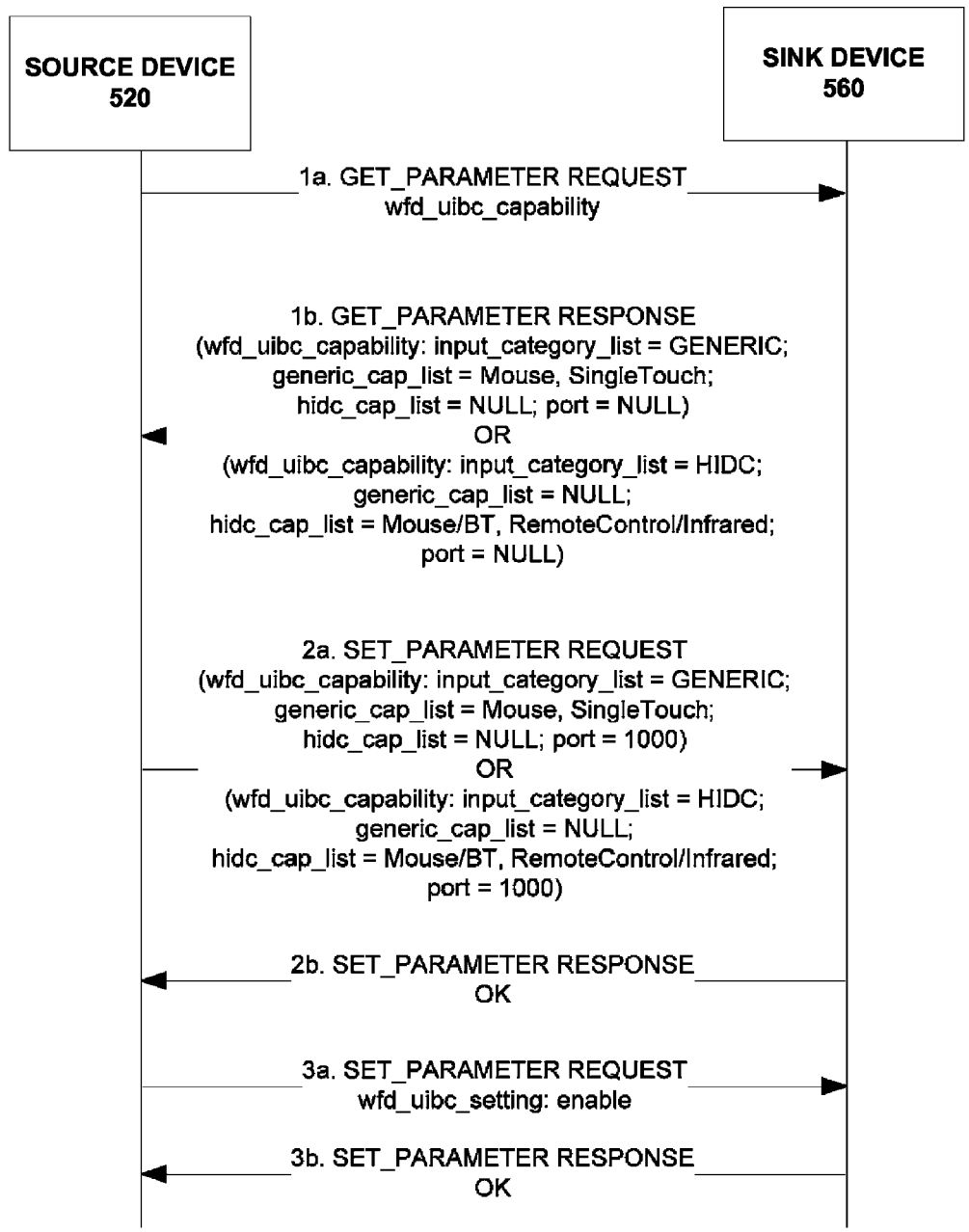

FIG. 5B is a block diagram illustrating another example message transfer sequence between a source device 560 and a sink device 520 as part of capabilities negotiations session. The message transfer sequence of FIG. 5B is intended provide a more detailed view of the transfer sequence described above for FIG. 5A. In FIG. 5B, message "1b. GET_PARAMETER RESPONSE" shows an example of a message that identifies a list of supported input categories (e.g. generic and HIDC) and a plurality of lists of supported input types. Each of the supported input categories of the list of supported input categories has an associated list of supported types (e.g. generic_cap_list and hidc_cap_list). In FIG. 5B, message "2a. SET_PARAMETER REQUEST" is an example of a second message that identifies a second list of supported input categories (e.g. generic and HIDC), and a plurality of second lists of supported types. Each of the supported input categories of the second list of supported input categories has an associated second list of supported types (e.g. generic_cap_list and hidc_cap_list). Message "1b. GET_PARAMETER RESPONSE" identifies the input categories and input types supported by sink device 560. Message "2a. SET_PARAMETER REQUEST" identifies input categories and input types supported by source device 520, but it may not be a comprehensive list of all input categories and input types supported by source device 520. Instead, message "2a. SET_PARAMETER REQUEST" may identify only those input categories and input types identified in message "1b. GET_PARAMETER RESPONSE" as being supported by sink device 560. In this manner, the input categories and input types identified in message "2a. SET_PARAMETER REQUEST" may constitute a subset of the input categories and input types identified in message "1b. GET_PARAMETER RESPONSE."

Figure 6:
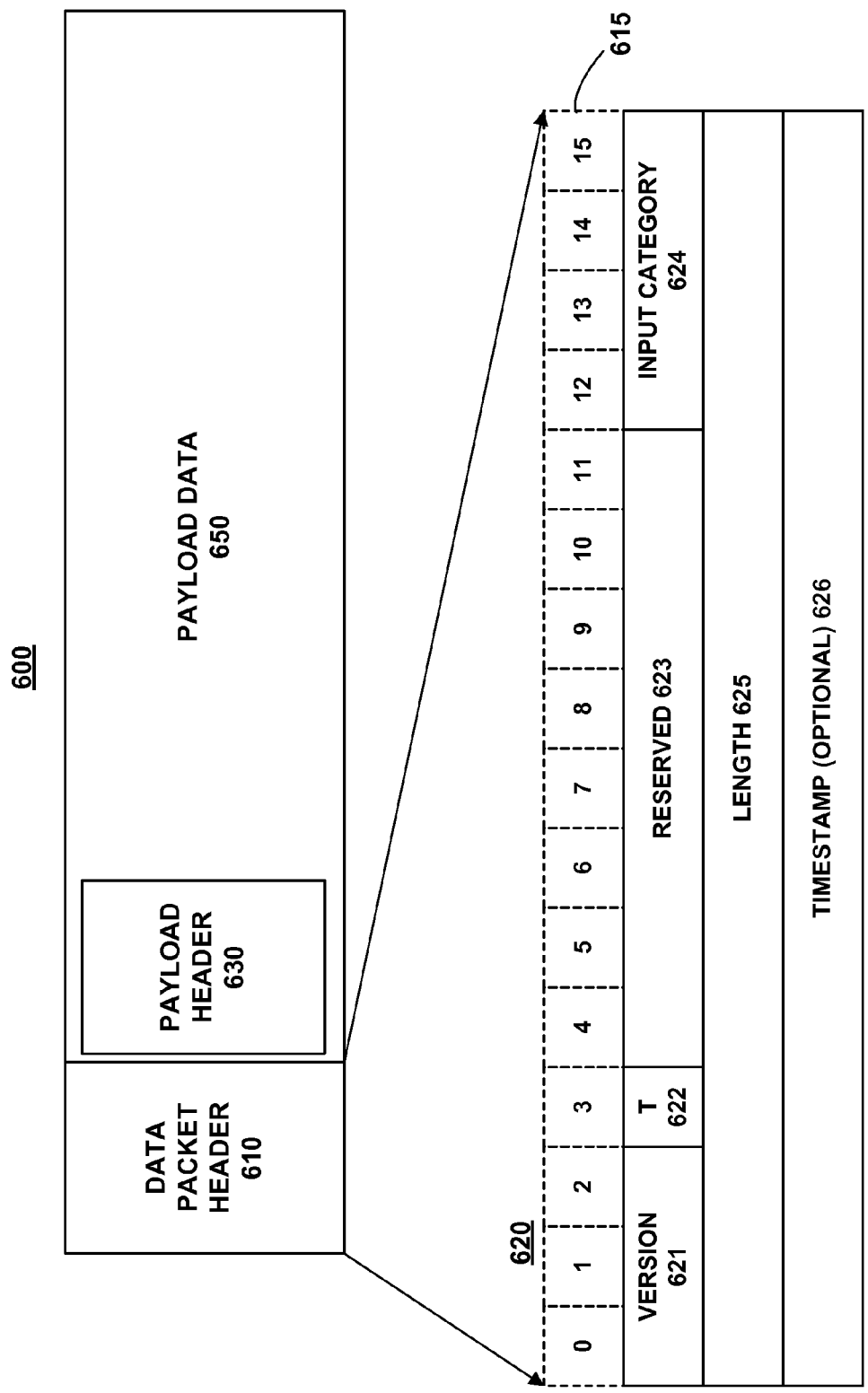
FIG. 6 shows an example data packet that may be used for delivering user input data obtained at a sink device to a source device.

FIG. 6 is a conceptual diagram illustrating one example of a data packet that may be generated by a sink device and transmitted to a source device. Aspects of data packet 600 will be explained with reference to FIG. 1A, but the techniques discussed may be applicable to additional types of source/sink systems. Data packet 600 may include a data packet header 610 followed by payload data 650. Payload data 650 may additionally include one or more payload headers (e.g. payload header 630). Data packet 600 may, for example, be transmitted from sink device 160 of FIG. 1A to source device 120, such that a user of sink device 160 can control audio/video data being transmitted by source device 120. In such an instance, payload data 650 may include user input data received at sink device 160. Payload data 650 may, for example, identify one or more user commands. Sink device 160 can receive the one or more user commands, and based on the received commands, can generate data packet header 610 and payload data 650. Based on the content of data packet header 610 of data packet 600, source device 120 can parse payload data 650 to identify the user input data received at sink device 160. Based on the user input data contained in payload data 650, source device 120 may alter in some manner the audio and video data being transmitted from source device 120 to sink device 160.

As used in this disclosure, the terms "parse" and "parsing" generally refer to the process of analyzing a bitstream to extract data from the bitstream. Once extracted, the data can be processed by source device 120, for example. Extracting data may, for example, include identifying how information in the bitstream is formatted. As will be described in more detail below, data packet header 610 may define a standardized format that is known to both source device 120 and sink device 160. Payload data 650, however, may be formatted in one of many possible ways. By parsing data packet header 610, source device 120 can determine how payload data 650 is formatted, and thus, source device 120 can parse payload data 650 to extract from payload data 650 one or more user input commands. This can provide flexibility in terms of the different types of payload data that can be supported in source-sink communication. As will be described in more detail below, payload data 650 may also include one or more payload headers such as payload header 630. In such instances, source device 120 may parse data packet header 610 to determine a format for payload header 630, and then parse payload header 630 to determine a format for the remainder of payload data 650.

Diagram 620 is a conceptual depiction of how data packet header 610 may be formatted. The numbers 0-15 in row 615 are intended to identify bit locations within data packet header 610 and are not intended to actually represent information contained within data packet header 610. Data packet header 610 includes version field 621, timestamp flag 622, reserved field 623, input category field 624, length field 625, and optional timestamp field 626.

In the example of FIG. 6, version field 621 is a 3-bit field that may indicate the version of a particular communications protocol being implemented by sink device 160. The value in version field 621 may inform source device 120 how to parse the remainder of data packet header 610 as well as how to parse payload data 650. In the example of FIG. 6, version field 621 is a three-bit field, which would enable a unique identifier for eight different versions. In other examples, more or fewer bits may be dedicated to version field 621.

In the example of FIG. 6, timestamp flag (T) 622 is a 1-bit field that indicates whether or not timestamp field 626 is present in data packet header 610. Timestamp field 626 is a 16-bit field containing a timestamp based on multimedia data that was generated by source device 120 and transmitted to sink device 160. The timestamp may, for example, be a sequential value assigned to frames of video by source device 120 prior to the frames being transmitted to sink device 160. Timestamp flag 622 may, for example, include a "1" to indicate timestamp field 626 is present and may include a "0" to indicate timestamp field 626 is not present. Upon parsing data packet header 610 and determining that timestamp field 626 is present, source device 120 can process the timestamp included in timestamp field 626. Upon parsing data packet header 610 and determining that timestamp field 626 is not present, source device 120 may begin parsing payload data 650 after parsing length field 625, as no timestamp field is present in data packet header 610.

If present, timestamp field 626 can include a timestamp to identify a frame of video data that was being displayed at wireless sink device 160 when the user input data of payload data 650 was obtained. The timestamp may, for example, have been added to the frame of video by source device 120 prior to source device 120 transmitting the frame of video to sink device 160. Accordingly, source device 120 may generate a frame of video and embed in the video data of the frame, as metadata for example, a timestamp. Source device 120 can transmit the video frame, with the timestamp, to sink device 160, and sink device 160 can display the frame of video. While the frame of video is being displayed by sink device 160, sink device 160 can receive a user command from a user. When sink device 160 generates a data packet to transfer the user command to source device 120, sink device 160 can include in timestamp field 626 the timestamp of the frame that was being displayed by sink device 160 when the user command was received.

Upon receiving data packet 600 with timestamp field 626 present in the header, wireless source device 120 may identify the frame of video being displayed at sink device 160 at the time the user input data of payload data 650 was obtained and process the user input data based on the content of the frame identified by the timestamp. For example, if the user input data is a touch command applied to a touch display or a click of a mouse pointer, source device 120 can determine the content of the frame being displayed at the time the user applied the touch command to the display or clicked the mouse. In some instances, the content of the frame may be needed to properly process the payload data. For example, a user input based on a user touch or a mouse click can be dependent on what was being shown on the display at the time of the touch or the click. The touch or click may, for example, correspond to an icon or menu option. In instances where the content of the display is changing, a timestamp present in timestamp field 626 can be used by source device 120 to match the touch or click to the correct icon or menu option.

Source device 120 may additionally or alternatively, compare the timestamp in timestamp field 626 to a timestamp being applied to a currently rendered frame of video. By comparing the timestamp of timestamp field 626 to a current timestamp, source device 120 can determine a round trip time. The round trip time generally corresponds to the amount of time that lapses from the point when a frame is transmitted by source device 120 to the point when a user input based on that frame is received back at source device 120 from sink device 160. The round trip time can provide source device 120 with an indication of system latency, and if the round trip time is greater than a threshold value, then source device 120 may ignore the user input data contained in payload data 650 under the assumption the input command was applied to an outdated display frame. When the round trip time is less than the threshold, source device 120 may process the user input data and adjust the audio/video content being transmitted in response to the user input data. Thresholds may be programmable, and different types of devices (or different source-sink combinations) may be configured to define different thresholds for round trip times that are acceptable.

In the example of FIG. 6, reserved field 623 is an 8-bit field that does not include information used by source 120 in parsing data packet header 610 and payload data 650. Future versions of a particular protocol (as identified in version field 621), however, may make use of reserved field 623, in which case source device 120 may use information in reserved field 623 for parsing data packet header 610 and/or for parsing payload data 650. Reserved field 623 in conjunction with version field 621 potentially provide capabilities for expanding and adding features to the data packet format without fundamentally altering the format and features already in use.

In the example of FIG. 6, input category field 624 is a 4-bit field to identify an input category for the user input data contained in payload data 650. Sink device 160 may categorize the user input data to determine an input category. Categorizing user input data may, for example, be based on the device from which a command is received or based on properties of the command itself. The value of input category field 624, possibly in conjunction with other information of data packet header 610, identifies to source device 120 how payload data 650 is formatted. Based on this formatting, source device 120 can parse payload data 650 to determine the user input that was received at sink device 160.

As input category 624, in the example of FIG. 6, is 4 bits, sixteen different input categories could possibly be identified. One such input category may be a generic input format to indicate that the user input data of payload data 650 is formatted using generic information elements defined in a protocol being executed by both source device 120 and sink device 160. A generic input format, as will be described in more detail below, may utilize generic information elements that allow for a user of sink device 160 to interact with source device 120 at the application level.

Another such input category may be a human interface device command (HIDC) format to indicate that the user input data of payload data 650 is formatted based on the type of input device used to receive the input data. Examples of types of devices include a keyboard, mouse, touch input device, joystick, camera, gesture capturing device (such as a camera-based input device), and remote control. Other types of input categories that might be identified in input category field 624 include a forwarding input format to indicate user data in payload data 650 did not originate at sink device 160, or an operating system specific format, and a voice command format to indicate payload data 650 includes a voice command.

Length field 625 may comprise a 16-bit field to indicate the length of data packet 600. The length may, for example, be indicated in units of 8-bits. As data packet 600 is parsed by source device 120 in words of 16 bits, data packet 600 can be padded up to an integer number of 16 bits. Based on the length contained in length field 625, source device 120 can identify the end of payload data 650 (i.e. the end of data packet 600) and the beginning of a new, subsequent data packet.

The various sizes of the fields provided in the example of FIG. 6 are merely intended to be explanatory, and it is intended that the fields may be implemented using different numbers of bits than what is shown in FIG. 6. Additionally, it is also contemplated that data packet header 610 may include fewer than all the fields discussed above or may use additional fields not discussed above. Indeed, the techniques of this disclosure may be flexible, in terms of the actual format used for the various data fields of the packets.

After parsing data packet header 610 to determine a formatting of payload data 650, source device 120 can parse payload data 650 to determine the user input command contained in payload data 650. Payload data 650 may have its own payload header (payload header 630) indicating the contents of payload data 650. In this manner, source device 120 may parse payload header 630 based on the parsing of data packet header 610, and then parse the remainder payload data 650 based on the parsing of the payload header 630.

If, for example, input category field 624 of data packet header 610 indicates a generic input is present in payload data 650, then payload data 650 can have a generic input format. Source device 120 can thus parse payload data 650 according to the generic input format. As part of the generic input format, payload data 650 can include a series of one or more input events with each input event having its own input event header. Table 1, below identifies the fields that may be included in an input header.

TABLE 1

| Field | Size (Octet) | Value |
| --- | --- | --- |
| Generic IE ID | 1 | See Table 2 |
| Length | 2 | Length of the following fields in octets |
| Describe | Variable | The details of the user inputs. See Tables |

The generic input event (IE) identification (ID) field identifies the generic input event identification for identifying an input type. The generic IE ID field may, for example, be one octet in length and may include an identification selected from Table 2 below. If, as in this example, the generic IE ID field is 8 bits, then 256 different types of inputs (identified 0-255) may be identifiable, although not all 256 identifications necessarily need an associated input type. Some of the 256 may be reserved for future use with future versions of whatever protocol is being implemented by sink device 160 and source device 120. In Table 2, for instance, generic IE IDs 9-255 do not have associated input types but could be assigned input types in the future.

The length field in the input event header identifies the length of the describe field while the describe field includes the information elements that describe the user input. The formatting of the describe field may be dependent on the type of input identifies in the generic IE ID field. Thus, source device 120 may parse the contents of the describe field based on the input type identified in the generic IE ID field. Based on the length field of the input event header, source device 120 can determine the end of one input event in payload data 650 and the beginning of a new input event. As will be explained in more detail below, one user command may be described in payload data 650 as one or more input events.

Table 2 provides an example of input types, each with a corresponding generic IE ID that can be used for identifying the input type.

TABLE 2

| Generic IE ID | INPUT TYPE |
| --- | --- |
| 0 | Left Mouse Down/Touch Down |
| 1 | Left Mouse Up/Touch Up |
| 2 | Mouse Move/Touch Move |
| 3 | Key Down |
| 4 | Key Up |
| 5 | Zoom |
| 6 | Vertical Scroll |
| 7 | Horizontal Scroll |
| 8 | Rotate |
| 9-255 | Reserved |

The describe fields associated with each input type may have a different format. The describe fields of a LeftMouse Down/TouchDown event, a Left Mouse Up/Touch Up event, and Mouse Move/Touch Move event may, for example, include the information elements identified in Table 3 below, although other formats could also be used in other examples.

TABLE 3

| Field | Size (Octet) | Notes |
| --- | --- | --- |
| Number of pointers (N) | 1 | Number of pointers of a multi-touch motion event. When set to 1, it indicates a single-touch motion event. |
| For i = 1: N { Pointer ID | 1 | The identification number of this pointer. The value lies in [0, 1, . . .] |
| X-coordinate | 2 | X-coordinate for the event normalized with respect to a negotiated resolution of a video stream between sink device and source device. |
| Y-coordinate} | 2 | Y-coordinate for the event normalized with respect to a negotiated resolution of a video stream between sink device and source device. |

The number of pointers may identify the number of touches or mouse clicks associated with an input event. Each pointer may have a unique pointer ID. If, for example, a multi-touch event includes a three finger touch, then the input event might have three pointers, each with a unique pointer ID. Each pointer (i.e. each finger touch) may have a corresponding x-coordinate and y-coordinate corresponding to where the touch occurred.

A single user command may be described as a series of input events. For example, if a three-finger swipe is a command to close an application, the three finger swipe may be described in payload data 650 as a touch down event with three pointers, a touch move event with three pointers, and a touch up event with three pointers. The three pointers of the touch down event may have the same pointer IDs as the three pointers of the touch move event and touch up event. Source device 120 can interpret the combination of those three input events as a three finger swipe.

The describe fields of a Key Down event or a Key Up event may, for example, include the information elements identified in Table 4 below.

TABLE 4

| Field | Size (Octet) | Notes |
| --- | --- | --- |
| Reserved | 1 | Reserved |
| Key code 1 (ASCII) | 2 | The key code of the first key down or up event. The basic/extended ASCII code uses the lower one byte. The higher one byte is reserved for future ASCII compatible key code |
| Key code 2 (ASCII) | 2 | The key code for the second key down or up event. The basic/extended ASCII code uses the lower one byte. The higher one byte is reserved for future ASCII compatible key code. |

The describe field of a zoom event may, for example, include the information elements identified in Table 5 below.

TABLE 5

| Field | Size (Octet) | Notes |
| --- | --- | --- |
| X | 2 | The reference X-coordinate for the zoom operation normalized with respect to with respect to a negotiated resolution of a video stream between sink device and source device. |
| Y | 2 | The reference Y-coordinate for the zoom operation normalized with respect to with respect to a negotiated resolution of a video stream between sink device and source device. |
| Integer times to zoom | 1 | The unsigned integer portion of the number of times to zoom |
| Fraction times to zoom | 1 | The fraction portion of the number of times to zoom |

The describe field of a horizontal scroll event or a vertical scroll event may, for example, include the information elements identified in Table 6 below.

TABLE 6

| Field | Size (Octet) | Notes |
| --- | --- | --- |
| Amount to scroll | 2 | Number of pixels to scroll normalized with respect to a negotiated resolution of a video stream between sink device and source device. A negative number can indicate to scroll right, and a positive number can indicate to scroll left |

The above examples have shown some exemplary ways that the payload data might be formatted for a generic input category. If input category field 624 of data packet header 610 indicates a different input category, such as a forwarded user input, then payload data 650 can have a different input format. With a forwarded user input, sink device 160 may receive the user input data from a third party device and forward the input to source device 120 without interpreting the user input data. Source device 120 can thus parse payload data 650 according to the forwarded user input format. For example, payload header 630 of payload data 650 may include a field to identify the third party device from which the user input was obtained. The field may, for example, include an internet protocol (IP) address of the third party device, MAC address, a domain name, or some other such identifier. Source device 120 can parse the remainder of the payload data based on the identifier of the third party device.

Sink device 160 can negotiate capabilities with the third party device via a series of messages. Sink device 160 can then transmit a unique identifier of the third party device to source device 120 as part of establishing a communication session with source device 120 as part of a capability negotiation process. Alternatively, sink device 160 may transmit information describing the third-party device to source device 120, and based on the information, source device 120 can determine a unique identifier for the third-party device. The information describing the third party device may, for example, include information to identify the third-party device and/or information to identify capabilities of the third-party device. Regardless of whether the unique identifiers is determined by source device 120 or sink device 160, when sink device 160 transmits data packets with user input obtained from the third part device, sink device 160 can include the unique identifier in the data packet, in a payload header for example, so that source device 120 can identify the origin of the user input.

If input category field 624 of data packet header 610 indicates yet a different input category, such as a voice command, then payload data 650 can have yet a different input format. For a voice command, payload data 650 may include coded audio. The codec for encoding and decoding the audio of the voice command can be negotiated between source device 120 and sink device 160 via a series of messages. For transmitting a voice command, timestamp field 626 may include a speech-sampling time value. In such an instance, timestamp flag 622 may be set to indicate a timestamp is present, but instead of a timestamp as described above, timestamp field 626 may include a speech-sampling time value for the encoded audio of payload data 650.

In some examples, a voice command may be transmitted as a generic command as described above, in which case input category field 624 may be set to identify the generic command format, and one of the reserved generic IE IDs may be assigned to voice commands. If the voice command is transmitted as a generic command, then a speech sampling rate may be present in timestamp field 626 of data packet header 610 or may be present in payload data 650.

For captured voice command data, the voice data can be encapsulated in multiple ways. For example, the voice command data can be encapsulated using RTP which can provide the payload type to identify the codec and timestamp, with the timestamp being used to identify the sampling rate. The RTP data can be encapsulated using the generic user input format described above, either with or without the optional timestamp. Sink device 160 can transmit the generic input data that carries the voice command data to source device 120 using TPC/IP.

As discussed previously, when coordinates are included as part of a data packet such as data packet 600, in payload data 650 for example, the coordinates may correspond to coordinates scaled based on a negotiated resolution, display window coordinates, normalized coordinates, or coordinates associated with a sink display. In some instances, additional information, may be included, either in the data packet or transmitted separately, for use by a source device to normalize coordinates received in the data packet.

Regardless of the input category for a particular data packet the data packet header may be an application layer packet header, and the data packet may be transmitted over TCP/IP. TCP/IP can enable sink device 160 and source device 120 to perform retransmission techniques in the event of packet loss. The data packet may be sent from sink device 160 to source device 120 to control audio data or video data of source device 120 or for other purposes such as to control an application running on source device 120.

Figure 7B:
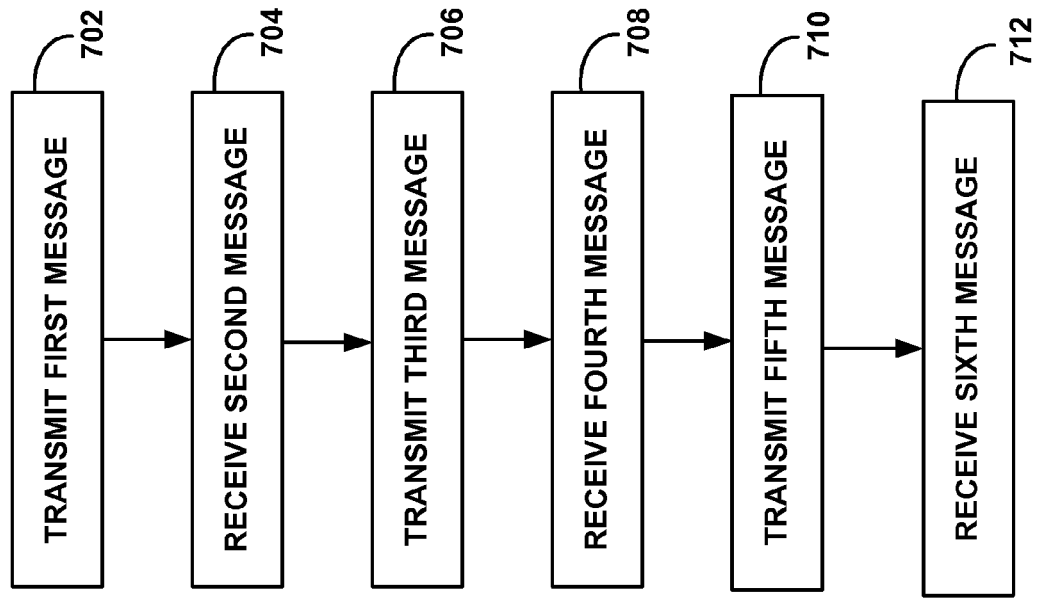
FIGS. 7A and 7B are flow charts illustrating techniques of this disclosure that may be used for capability negotiation between a source device and a sink device.
Figure 7A:
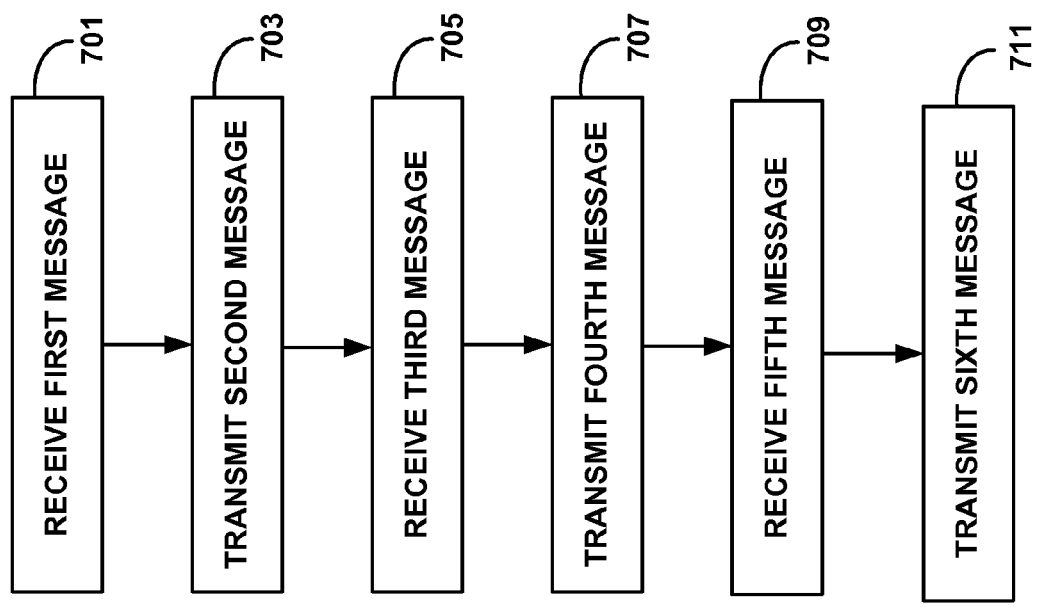

FIG. 7A is a flowchart of an example method of negotiating capabilities between a sink device and a source device. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in one or more of the flow charts described herein.

The method of FIG. 7A includes sink device 160 receiving from the source device 120 a first message (701). The message may, for example, comprise a get parameter request. In response to the first message, sink device 160 may send a second message to source device 120 (703). The second message may, for example, comprise a get parameter response that identifies a first list of supported input categories and a plurality of first lists of supported types, wherein each of the supported input categories of the first list of supported input categories has an associated first list of supported types. The supported input categories may, for example, correspond to the same categories used for input category field 624 of FIG. 6. Table 2 above represents one example of supported types for a particular input category (generic inputs in this example). Sink device 160 may receive from source device 120, a third message (705). The third message may, for example, comprise a set parameter request, wherein the set parameter request identifies a port for communication, a second list of supported input categories, and a plurality of second lists of supported types, with each of the supported input categories of the second list of supported input categories having an associated second list of supported types, and each of the supported types of the second lists including a subset of the types of the first lists. Sink device 160 can transmit to source device 120 a fourth message (707). The fourth message may, for example, comprise a set parameter response to confirm that the types of the second lists have been enabled. Sink device 160 can receive from source device 120 a fifth message (709). The fifth message may, for example, comprise a second set parameter request that indicates that a communication channel between the source device 120 and sink device 160 has been enabled. The communication channel may, for example, comprise a user input back channel (UIBC). Sink device 160 can transmit to source device 120 a sixth message (711). The sixth message may, for example, comprise a second set parameter response that confirms receipt of the second set parameter request by sink device 160.

FIG. 7B is a flowchart of an example method of negotiating capabilities between a sink device and a source device. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 7B includes source device 120 transmitting to sink device 160 a first message (702). The first message may, for example, comprise a get parameter request. Source device 120 can receive a second message from sink device 160 (704). The second message may, for example, comprise a get parameter response that identifies a first list of supported input categories and a plurality of first lists of supported types, wherein each of the supported input categories of the first list of supported input categories has an associated first list of supported types. Source device 120 may transmit to sink device 160, a third message (706). The third message may, for example, comprise a set parameter request that identifies a port for communication, a second list of supported input categories, and a plurality of second lists of supported types, with each of the supported input categories of the second list of supported input categories having an associated second list of supported types, and each of the supported types of the second lists including a subset of the types of the first lists. Source device 120 can receive from sink device 160 a fourth message (708). The fourth message may, for example, comprise a set parameter response to confirm that the types of the second lists have been enabled. Source device 120 can transmit to sink device 160 a fifth message (710). The fifth message may, for example, comprise a second set parameter request that indicates that a communication channel between the source device 120 and sink device 160 has been enabled. The communication channel may, for example, comprise a user input back channel (UIBC). Source device 120 can receive from sink device 160 a sixth message (712). The sixth message may, for example, comprise a second set parameter response that confirms receipt of the second set parameter request by sink device 160.

Figure 8B:
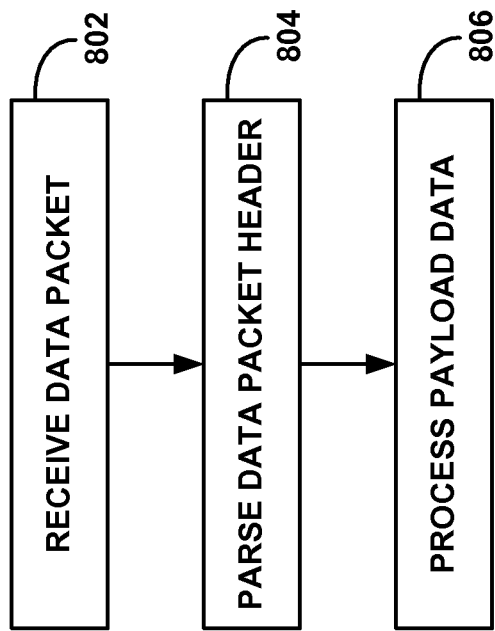
FIGS. 8A and 8B are flow charts illustrating techniques of this disclosure that may be used for transmitting and receiving data packets with user input data.
Figure 8A:
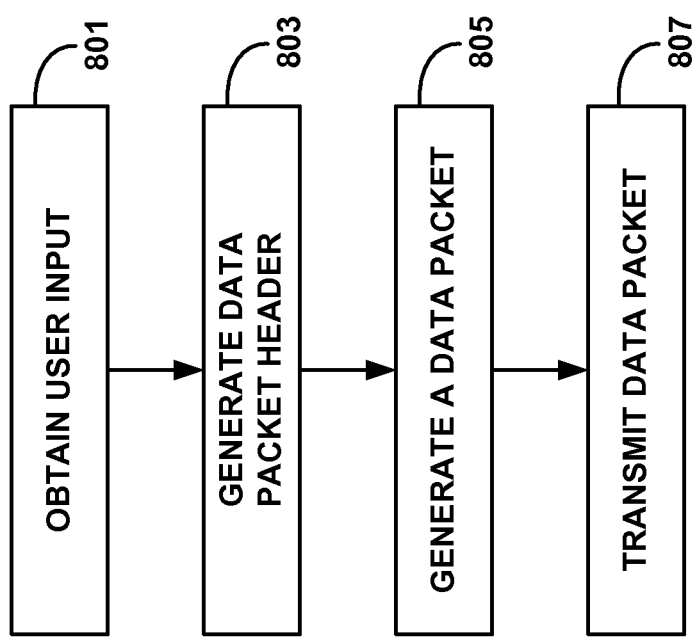

FIG. 8A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 8A includes obtaining user input data at a wireless sink device, such as wireless sink device 160 (801). The user input data may be obtained through a user input component of wireless sink device 160 such as, for example, user input interface 376 shown in relation to wireless sink device 360. Additionally, sink device 160 may categorize the user input data as, for example, generic, forwarded, or operating system specific. Sink device 160 may then generate a data packet header based on the user input data (803). The data packet header can be an application layer packet header. The data packet header may comprise, among other fields, a field to identify an input category corresponding to the user input data. The input category may comprise, for example, a generic input format or a human interface device command. Sink device 160 may further generate a data packet (805), where the data packet comprises the generated data packet header and payload data. In one example, payload data may include received user input data and may identify one or more user commands. Sink device 160 may then transmit the generated data packet (807) to the wireless source device (e.g., source device 120 of FIG. 1A or 220 of FIG. 2). Sink device 160 may comprise components that allow transfer of data packets, including transport unit 333 and wireless modem 334 as shown in FIG. 3, for example. Sink device 160 may transfer the data packet over TCP/IP.

FIG. 8B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 8B includes receiving a data packet (802), where the data packet may comprise, among other things, a data packet header and payload data. Payload data may include, for example, user input data. Source device 120 may comprise communications components that allow transfer of data packets, including transport unit 233 and wireless modem 234, for example as shown in reference to FIG. 2. Source device 120 may then parse the data packet header (804) included in the data packet, to determine an input category associated with the user input data contained in the payload data. Source device 120 may process the payload data based on the determined input category (806). The data packets described with reference to FIGS. 8A and 8B may generally take the form of the data packets described with reference to FIG. 6 and may be used to control audio/video data and applications at a source device.

Figure 9B:
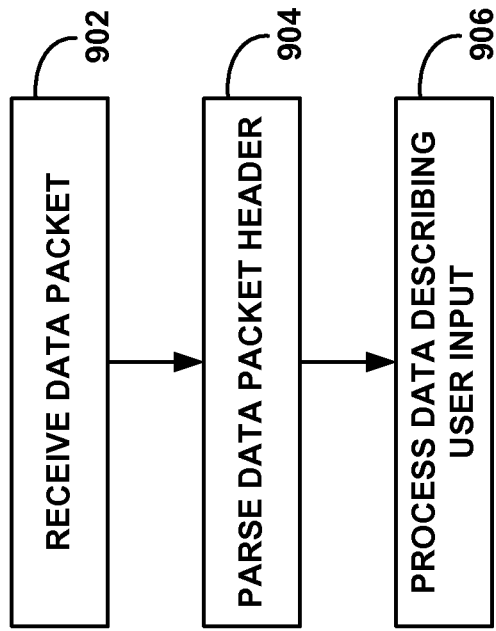
FIGS. 9A and 9B are flow charts illustrating techniques of this disclosure that may be used for transmitting and receiving data packets with user input data.
Figure 9A:
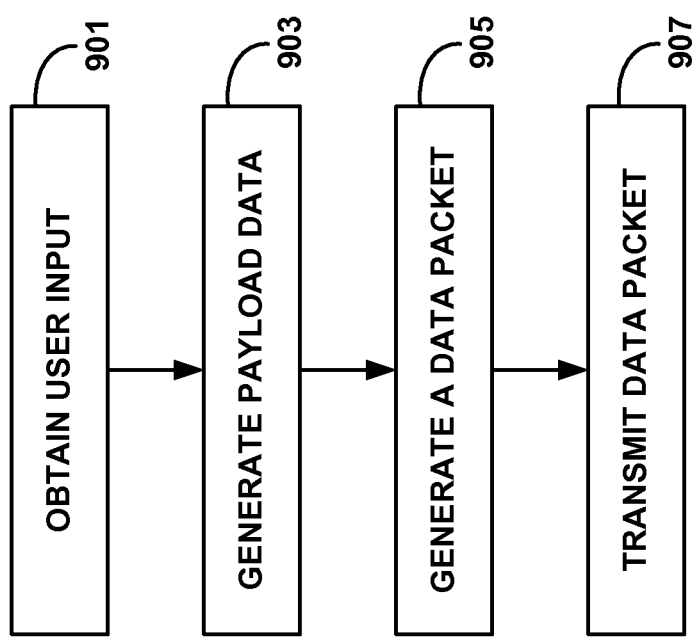

FIG. 9A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 9A includes obtaining user input data at a wireless sink device such as wireless sink device 160 (901). The user input data may be obtained through a user input component of wireless sink device 160 such as, for example, user input interface 376 shown with reference to FIG. 3. Sink device 160 may then generate payload data (903), where the payload data may describe the user input data. In one example, payload data may include received user input data and may identify one or more user commands. Sink device 160 may further generate a data packet (905), where the data packet comprises a data packet header and the generated payload data. Sink device 160 may then transmit the generated data packet (907) to the wireless source device (e.g., source device 120 of FIG. 1A or 220 of FIG. 2). Sink device 160 may comprise components that allow transfer of data packets, such as transport unit 333 and wireless modem 334, for example. The data packet can be transmitted to a wireless source device over TCP/IP.

FIG. 9B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 9B includes receiving a data packet from sink device 360 (902), where the data packet may comprise, among other things, a data packet header and payload data. In one example, payload data may comprise, for example, data describing details of a user input such as input type value. Source device 120 may comprise communications components that allow transfer of data packets, including transport unit 233 and wireless modem 234, for example as shown with reference to FIG. 2. Source device 120 may then parse the data packet (904) to determine an input type value in an input type field in the payload data. Source device 120 may process the data describing details of the user input based on the determined input type value (906). The data packets described with reference to FIGS. 9A and 9B may generally take the form of the data packets described with reference to FIG. 6.

Figure 10B:
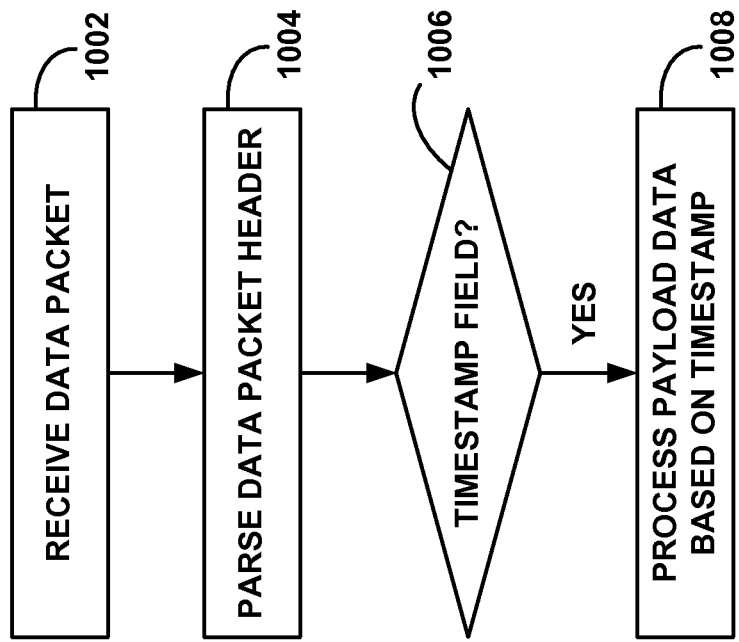
FIGS. 10A and 10B are flow charts illustrating techniques of this disclosure that may be used for transmitting and receiving data packets with timestamp information and user input data.
Figure 10A:
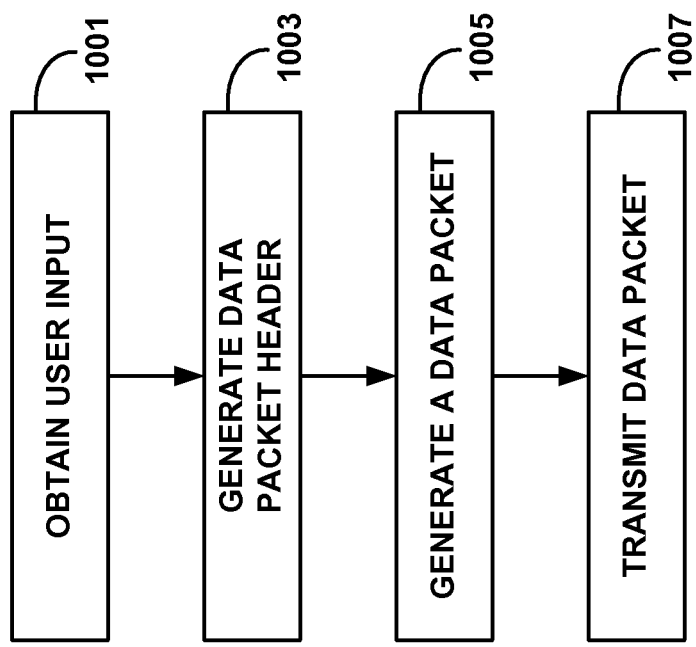

FIG. 10A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 10A includes obtaining user input data at a wireless sink device, such as wireless sink device 160 (1001). The user input data may be obtained through a user input component of wireless sink device 160 such as, for example, user input interface 376 as shown with reference to FIG. 3. Sink device 160 may then generate a data packet header based on the user input (1003). The data packet header may comprise, among other fields, a timestamp flag (e.g., a 1-bit field) to indicate if a timestamp field is present in the data packet header. The timestamp flag may, for example, include a "1" to indicate timestamp field is present and may include a "0" to indicate timestamp field is not present. The timestamp field may be, for example, a 16-bit field containing a timestamp generated by source device 120 and added to video data prior to transmission. Sink device 160 may further generate a data packet (1005), where the data packet comprises the generated data packet header and payload data. In one example, payload data may include received user input data and may identify one or more user commands. Sink device 160 may then transmit the generated data packet (1007) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 10B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 10B includes receiving a data packet from wireless sink device 160 (1002), where the data packet may comprise, among other things, a data packet header and payload data. Payload data may include, for example, user input data. Source device 120 may comprise communications components that allow transfer of data packets, including transport unit 233 and wireless modem 234, for example as shown in reference to FIG. 2. Source device 120 may then parse the data packet header (1004) included in the data packet. Source device 120 may determine if a timestamp field is present in the data packet header (1006). In one example, Source device 120 may make the determination based on a timestamp flag value included in the data packet header. If the data packet header includes a timestamp field, Source device 120 may process the payload data based on a timestamp that is in the timestamp field (1008). The data packets described with reference to FIGS. 10A and 10B may generally take the form of the data packets described with reference to FIG. 6 and may be used to control audio/video data at a source device.

Figures 11A, 11B:
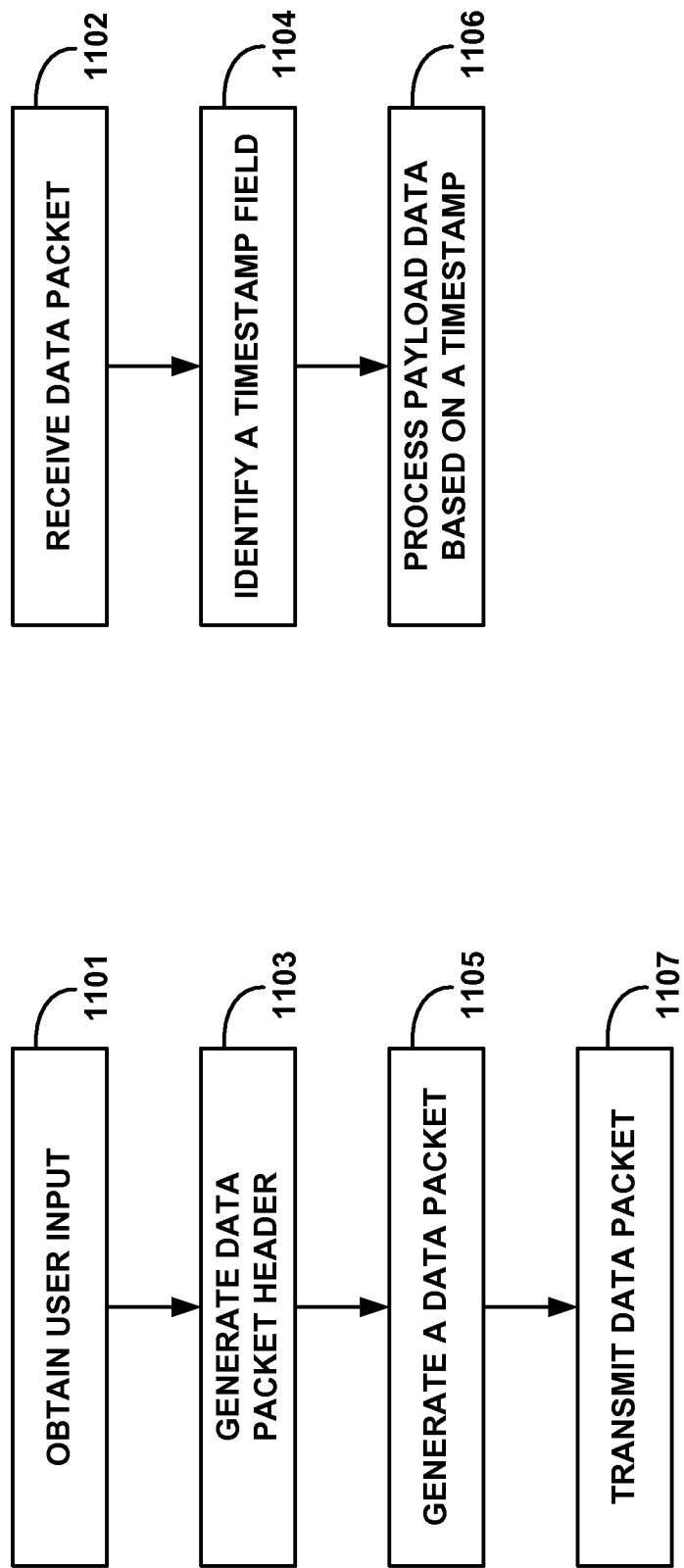
FIGS. 11A and 11B are flow charts illustrating techniques of this disclosure that may be used for transmitting and receiving data packets with timestamp information and user input data.

FIG. 11A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 11A includes obtaining user input data at a wireless sink device, such as wireless sink device 160 (1101). The user input data may be obtained through a user input component of wireless sink device 160 such as, for example, user input interface 376 shown in reference to FIG. 3. Sink device 160 may then generate a data packet header based on the user input (1103). The data packet header may comprise, among other fields, a timestamp field. The timestamp field may comprise, for example, a 16-bit field containing a timestamp based on multimedia data that was generated by wireless source device 120 and transmitted to wireless sink device 160. The timestamp may have been added to the frame of video data by wireless source device 120 prior to being transmitted to the wireless sink device. The timestamp field may, for example, identify a timestamp associated with a frame of video data being displayed at wireless sink device 160 at the time the user input data was captured. Sink device 160 may further generate a data packet (1105), where the data packet comprises the generated data packet header and payload data. In one example, payload data may include received user input data and may identify one or more user commands. Sink device 160 may then transmit the generated data packet (1107) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 11B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 11B includes receiving a data packet from a wireless sink device, such as wireless sink device 160 (1102), where the data packet may comprise, among other things, a data packet header and payload data. Payload data may include, for example, user input data. Source device 120 may comprise communications components that allow transfer of data packets, including transport unit 233 and wireless modem 234, for example as shown in reference to FIG. 2. Source device 120 may then identify a timestamp field in the data packet header (1104). Source device 120 may process the payload data based on a timestamp that is in the timestamp field (1106). As part of processing the payload data, based on the timestamp, source device 120 may identify a frame of video data being displayed at the wireless sink device at the time the user input data was obtained and interpret the payload data based on content of the frame. As part of processing the payload data based on the timestamp, source device 120 may compare the timestamp to a current timestamp for a current frame of video being transmitted by source device 120 and may perform a user input command described in the payload data in response to a time difference between the timestamp and the current timestamp being less than a threshold value, or not perform a user input command described in the payload data in response to a time difference between the timestamp and the current timestamp being greater than a threshold value. The data packets described with reference to FIGS. 11A and 11B may generally take the form of the data packets described with reference to FIG. 6 and may be used to control audio/video data at a source device.

Figure 12B:
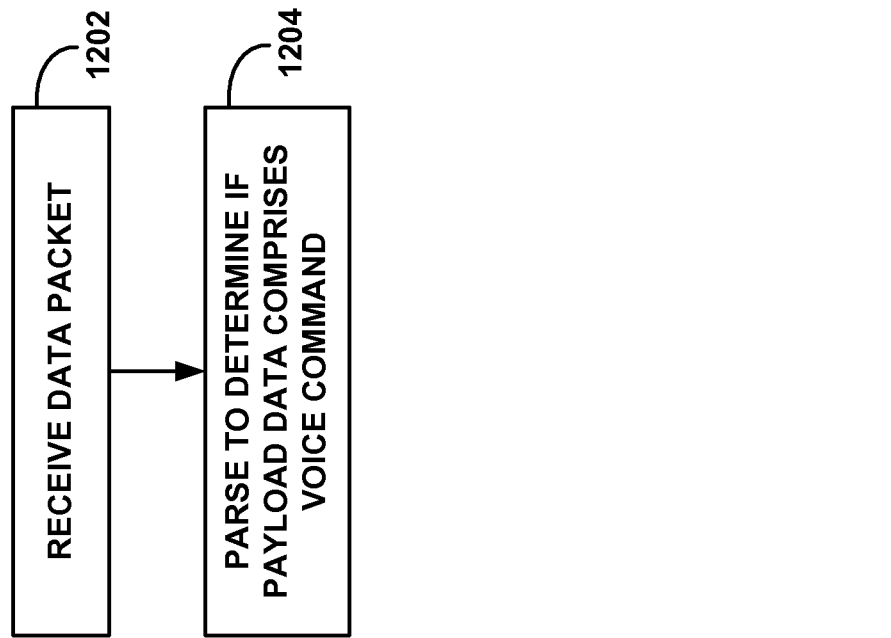
FIGS. 12A and 12B are flow charts illustrating techniques of this disclosure that may be used for transmitting and receiving data packets that include voice commands.
Figure 12A:
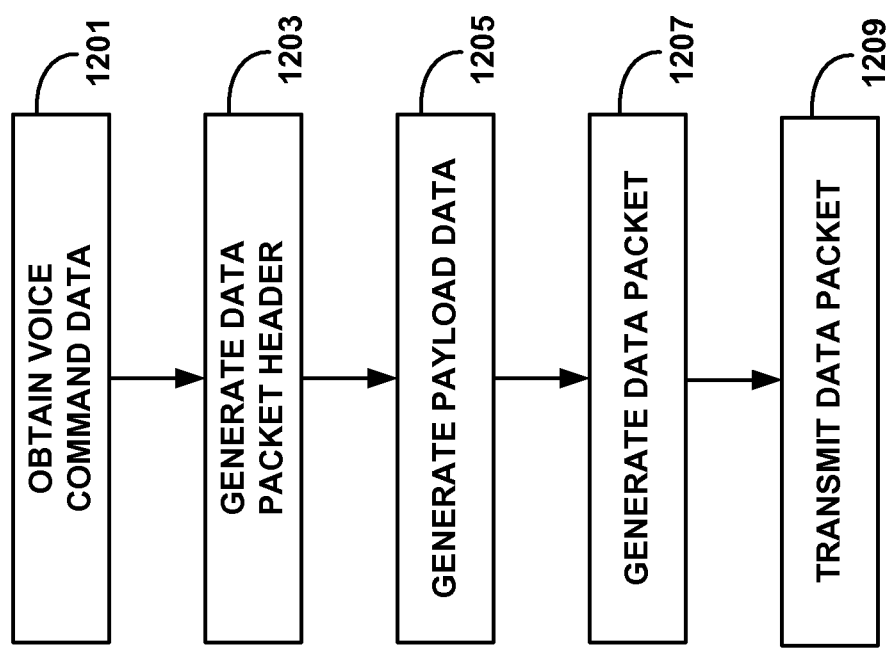

FIG. 12A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 12A includes obtaining user input data at a wireless sink device, such as wireless sink device 160 (1201). In one example, the user input data may be voice command data, which may be obtained through a user input component of wireless sink device 160 such as, for example, a voice command recognition module included in user input interface 376 in FIG. 3. Sink device 160 may generate a data packet header based on the user input (1203). Sink device 160 may also generate payload data (1205), where the payload data may comprise the voice command data. In one example, payload data may also include received user input data and may identify one or more user commands. Sink device 160 may further generate a data packet (1207), where the data packet comprises the generated data packet header and payload data. Sink device 160 may then transmit the generated data packet (1209) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 12B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 12B includes receiving a data packet (1202), where the data packet may comprise, among other things, a data packet header and payload data. Payload data may include, for example, user input data such as voice command data. Source device 120 may comprise communications components that allow transfer of data packets, including transport unit 233 and wireless modem 234, for example as shown in reference to FIG. 2. Source device 120 may then parse the payload data (1204) included in the data packet, to determine if the payload data comprises voice command data. The data packets described with reference to FIGS. 12A and 12B may generally take the form of the data packets described with reference to FIG. 6 and may be used to control audio/video data at a source device.

Figure 13B:
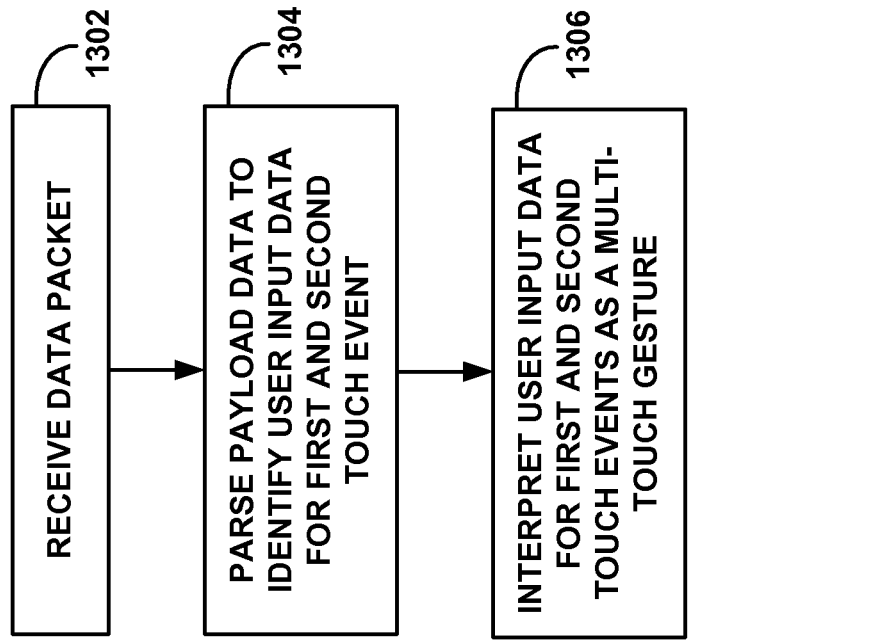
FIGS. 13A and 13B are flow charts illustrating techniques of this disclosure that may be used for transmitting and receiving data packets with multi-touch user input commands.
Figure 13A:
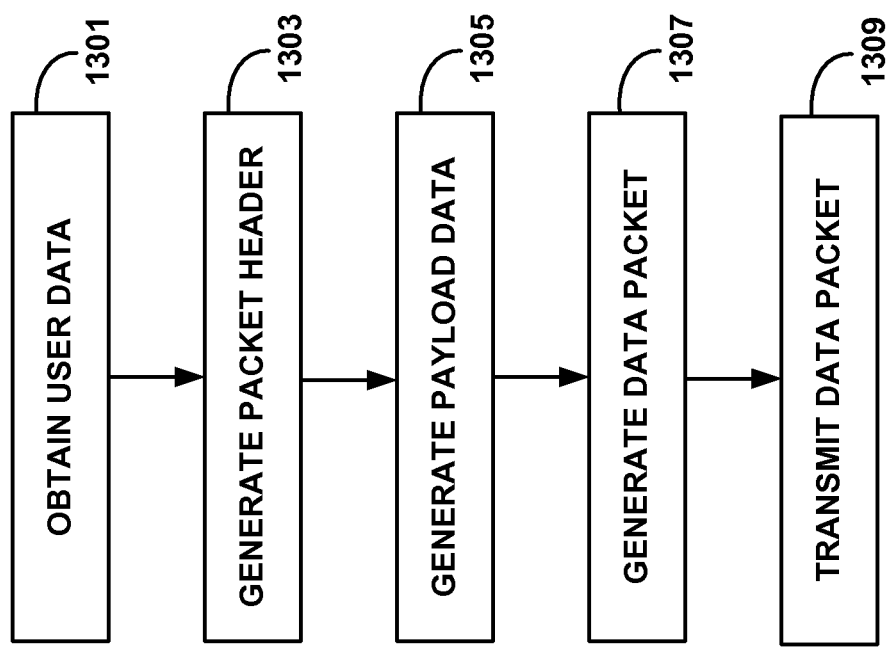

FIG. 13A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 13A includes obtaining user input data at a wireless sink device, such as wireless sink device 160 (1301). In one example, the user input data may be a multi-touch gesture, which may be obtained through a user input component of wireless sink device 160 such as, for example, UI 167 or user input interface 376 of FIG. 3. In one example, the multi-touch gesture may comprise a first touch input and a second touch input. Sink device 160 may generate a data packet header based on the user input (1303). Sink device 160 may also generate payload data (1305), where the payload data may associate user input data for the first touch input event with a first pointer identification and user input data for the second touch input event with a second pointer identification. Sink device 160 may further generate a data packet (1307), where the data packet comprises the generated data packet header and payload data. Sink device 160 may then transmit the generated data packet (1309) to the wireless source device (e.g., source device 120 of FIG. 1A or 220 of FIG. 2). Sink device 160 may comprise components that allow transfer of data packets, including transport unit 333 and wireless modem 334, for example as shown in reference to FIG. 3. The data packet can be transmitted to a wireless source device over TCP/IP.

FIG. 13B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 13B includes receiving a data packet (1302), where the data packet may comprise, among other things, a data packet header and payload data. Payload data may include, for example, user input data such as multi-touch gesture. Source device 120 may comprise communications components that allow transfer of data packets, including transport unit 233 and wireless modem 234, for example as shown in FIG. 2. Source device 120 may then parse the payload data (1304) included in the data packet, to identify user input data included in the payload data. In one example, the identified data may include user input data for a first touch input event with a first pointer identification and user input data for a second touch input event with a second pointer identification. Source device 120 may then interpret the user input data for the first touch input event and the user input data for the second touch input event as a multi-touch gesture (1306). The data packets described with reference to FIGS. 13A and 13B may generally take the form of the data packets described with reference to FIG. 6 and may be used to control audio/video data at a source device.

Figure 14B:
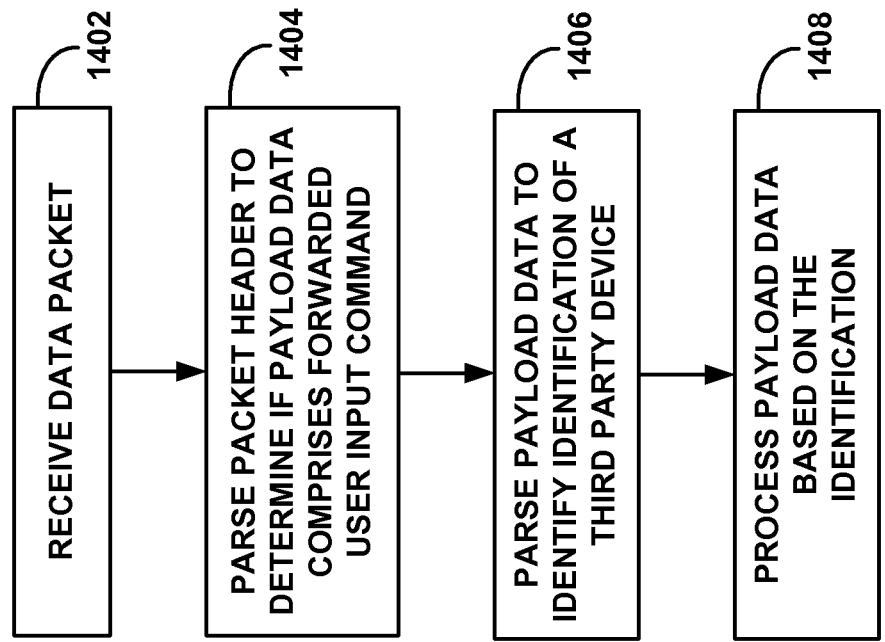
FIGS. 14A and 14B are flow charts illustrating techniques of this disclosure that may be used for transmitting and receiving data packets with user input data forwarded form a third party device.
Figure 14A:
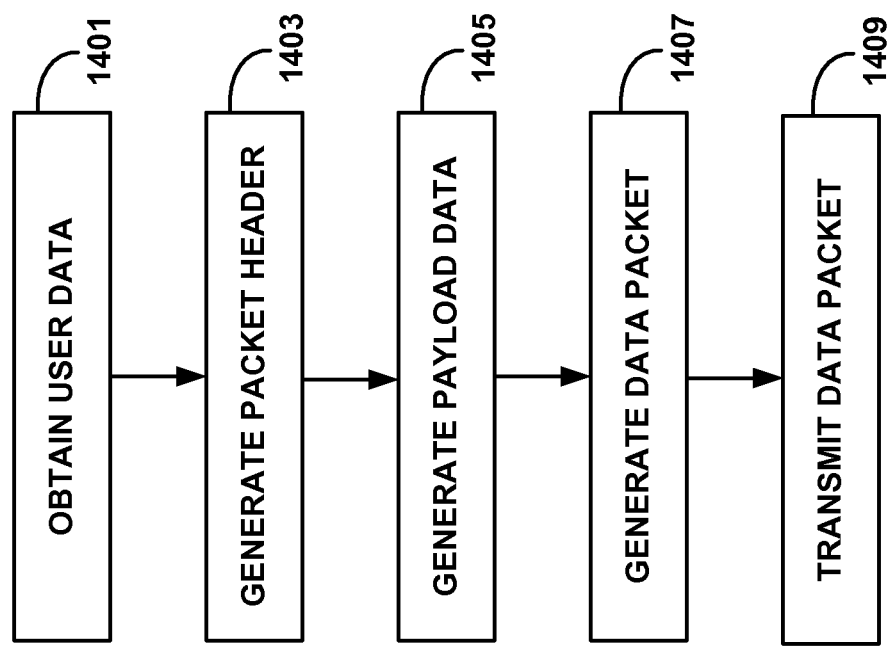

FIG. 14A is a flow chart of an example method of transmitting user input data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 14A includes obtaining user input data at wireless sink device 360 from an external device (1401). In one example, the external device may be a third party device connected to the sink device. Sink device 160 may generate a data packet header based on the user input (1403). In one example, the data packet header may identify the user input data as forwarded user input data. Sink device 160 may also generate payload data (1405), where the payload data may comprise the user input data. Sink device 160 may further generate a data packet (1407), where the data packet may comprise the generated data packet header and payload data. Sink device 160 may then transmit the generated data packet (1409) to the wireless source device (e.g., source device 120 of FIG. 1A or 220 of FIG. 2). Sink device 160 may comprise components that allow transfer of data packets, including transport unit 333 and wireless modem 334, for example as shown with reference to FIG. 3. The data packet can be transmitted to a wireless source device over TCP/IP.

FIG. 14B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 14B includes receiving a data packet (1402), where the data packet may comprise, among other things, a data packet header and payload data. Payload data may include, for example, user input data such as a forwarded user input command indicating user input data was forwarded from a third party device. Source device 120 may comprise communications components that allow transfer of data packets, including transport unit 233 and wireless modem 234, for example as shown in reference to FIG. 2. Source device 120 may then parse the data packet header and may determine that the payload data comprises a forwarded user input command (1404). Source device 120 may then parse the payload data (1406) included in the data packet, to identify an identification associated with the third party device corresponding to the forwarded user input command. Source device 120 may then process the payload data based on the identified identification of the third party device (1408). The data packets described with reference to FIGS. 14A and 14B may generally take the form of the data packets described with reference to FIG. 6 and may be used to control audio/video data at a source device.

Figure 15B:
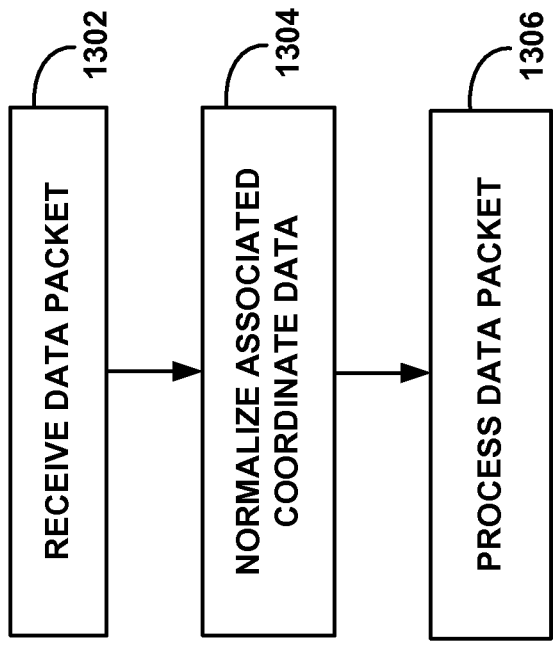
FIGS. 15A and 15B are flow charts illustrating techniques of this disclosure that may be used for transmitting and receiving data packets.
Figure 15A:
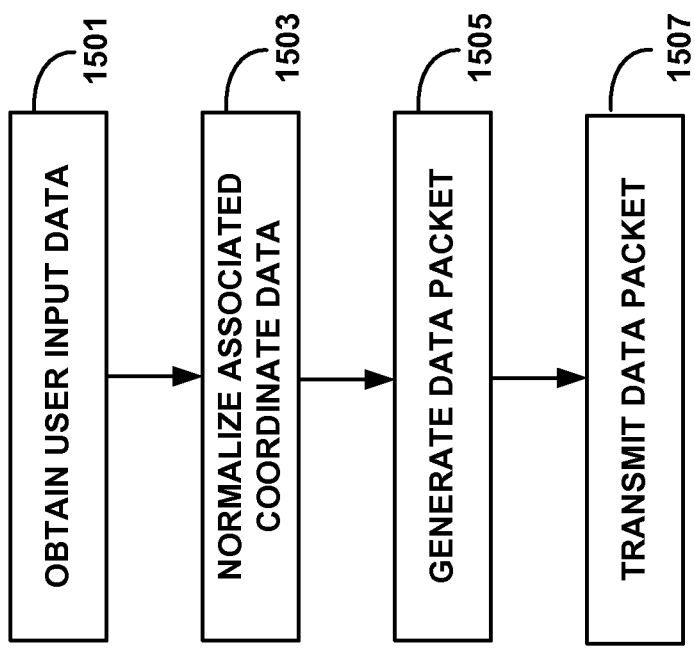

FIG. 15A is a flow chart of an example method of transmitting user data from a wireless sink device to a wireless source device in accordance with this disclosure. The illustrated example method may be performed by sink device 160 (FIG. 1A) or 360 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart.

The method of FIG. 15A includes obtaining user input data at the wireless sink device (1501). The user input data can have associated coordinate data. The associated coordinate data may, for example, corresponds to a location of a mouse click event or a location of a touch event. Sink device 160 may then normalize the associated coordinate data to generate normalized coordinate data (1503). Sink device 160 may then generate a data packet that includes the normalized coordinate data (1505). Normalizing the coordinate data can include scaling the associated coordinate data based on a ratio of the resolution of a display window and a resolution of the display of the source, such as display 22 of source device 120. The resolution of the display window can be determined by sink device 160, and the resolution of the display of the source device can be received from source device 120. Sink device 160 may then transmit the data packet with the normalized coordinates to wireless source device 120 (1507). As part of the method of FIG. 15A, sink device 160 may also determine if the associated coordinate data is within a display window for content being received from the wireless source device, and for example, process a user input locally if the associated coordinate data is outside the display window, or otherwise normalize the coordinates as described if the input is within the display window.

FIG. 15B is a flow chart of an example method of receiving user input data from a wireless sink device at a wireless source device in accordance with this disclosure. The illustrated example method may be performed by source device 120 (FIG. 1A) or 220 (FIG. 2). In some examples, a computer-readable storage medium (e.g., memory 232) may store instructions, modules, or algorithms that, when executed, cause one or more processors (e.g., processor 231) to perform one or more of the illustrated steps in the flow chart.

The method of FIG. 15B includes receiving a data packet at the wireless source device, where the data packet comprises user input data with associated coordinate data (1502). The associated coordinate data may, for example, corresponds to a location of a mouse click event or a location of a touch event at a sink device. Source device 120 may then normalize the associated coordinate data to generate normalized coordinate data (1504). Source device 120 can normalize the coordinate data by scaling the associated coordinate data based on a ratio of the resolution of the display window and a resolution of the display of the source. Source device 120 can determine the resolution of the display of the source device and can receive the resolution of the display window from the wireless sink device. Source device may then process the data packet based o the normalized coordinate data (1506). The data packets described with reference to FIGS. 15A and 15B may generally take the form of the data packets described with reference to FIG. 6 and may be used to control audio/video data at a source device.

For simplicity of explanation, aspects of this disclosure have been described separately with reference to FIGS. 7-15. It is contemplated, however, that these various aspects can be combined and used in conjunction with one another and not just separately. Generally, functionality and/or modules described herein may be implemented in either or both of the wireless source device and wireless sink device. In this way, user interface capabilities described in the current example may be used interchangeably between the wireless source device and wireless sink device.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a tangible and non-transitory computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of transmitting user input data from a wireless sink device to a wireless source device, the method comprising:
    performing capability negotiation to determine one or more categories of user input supported by the wireless source device, wherein performing the capability negotiation comprises:
        transmitting, by the wireless sink device and to the wireless source device a real-time streaming protocol (RTSP) message that indicates a first set of one or more categories of user input supported by the sink device;
        receiving, by the wireless sink device and from the wireless source device, an RTSP message that indicates a second set of one or more user input categories supported by the sink device and with which the wireless source device is compatible; and
        transmitting, by the wireless sink device and to the wireless source device, a message confirming one of the second set of supported user input categories is enabled;
    after performing the capability negotiation, obtaining user input data at the wireless sink device;
    generating a data packet header, wherein the data packet header comprises a field to identify the enabled input category of the user input data;
    generating a data packet comprising the data packet header and payload data, wherein the enabled input category identifies how the payload data is formatted; and
    transmitting the data packet to the wireless source device.

2. The method of claim 1, further comprising:
    categorizing the user input data to determine the input category of the user input data.

3. The method of claim 1, wherein the payload data describes the user input data.

4. The method of claim 1, wherein obtaining the user input data comprises capturing the user input data through an input device of the wireless sink device.

5. The method of claim 1, wherein obtaining the user input data comprises receiving forwarded user input data from another wireless sink device.

6. The method of claim 1, wherein the data packet header is an application layer packet header.

7. The method of claim 1, wherein the data packet is to control audio data or video data of the wireless source device.

8. The method of claim 1, wherein the input category is a generic command.

9. The method of claim 1, wherein the input category is selected from the group consisting of a forwarded command and an operating system (OS) specific command.

10. The method of claim 1, wherein the data packet header further comprises a field identifying if an optional timestamp entry is present.

11. The method of claim 1, wherein the data packet header further comprises a field for a timestamp entry.

12. The method of claim 1, wherein the data packet header further comprises a field identifying a version of a protocol being used for communication.

13. The method of claim 1, wherein the data packet is transmitted over TCP/IP.

14. A wireless sink device configured to transmit user input data to a wireless source device, the wireless sink device comprising:
  a memory storing instructions;
  one or more processors configured to execute the instructions, wherein upon execution of the instructions the one or more processors cause:
    performing capability negotiation to determine one or more categories of user input supported by the wireless source device, wherein to perform the capability negotiation, the one or more processors further cause:
    transmitting, by the wireless sink device and to the wireless source device a real-time streaming protocol (RTSP) message that indicates a first set of one or more user input supported by the sink device;
    receiving, by the wireless sink device and from the wireless source device, an RTSP message that indicates a second set of user input categories supported by the sink device and with which the wireless source device is compatible; and
    transmitting, by the wireless sink device, and to the wireless source device, a message confirming one of the second set of supported user input categories is enabled;
  after performing the capability negotiation, obtaining user input data at the wireless sink device;
  generating a data packet header, wherein the data packet header comprises a field to identify the enabled input category of the user input data;
  generating a data packet comprising the data packet header and payload data, wherein the enabled input category identifies how the payload data is formatted; and
  a transport unit to transmit the data packet to the wireless source device.

15. The wireless sink device of claim 14, wherein upon execution of the instructions the one or more processors further cause:
  categorizing the user input data to determine the input category of the user input data.

16. The wireless sink device of claim 14, wherein the payload data describes the user input data.

17. The wireless sink device of claim 14, wherein obtaining the user input data comprises capturing the user input data through an input device of the wireless sink device.

18. The wireless sink device of claim 14, wherein obtaining the user input data comprises receiving forwarded user input data from another wireless sink device.

19. The wireless sink device of claim 14, wherein the data packet header is an application layer packet header.

20. The wireless sink device of claim 14, wherein the data packet is to control audio data or video data of the wireless source device.

21. The wireless sink device of claim 14, wherein the input category is a generic command.

22. The wireless sink device of claim 14, wherein the input category is selected from the group consisting of a forwarded command and an operating system (OS) specific command.

23. The wireless sink device of claim 14, wherein the data packet header further comprises a field identifying if an optional timestamp entry is present.

24. The wireless sink device of claim 14, wherein the data packet header further comprises a field for a timestamp entry.

25. The wireless sink device of claim 14, wherein the data packet header further comprises a field identifying a version of a protocol being used for communication.

26. The wireless sink device of claim 14, wherein the data packet is transmitted over TCP/IP.

27. A non-transitory computer-readable storage medium storing instructions that upon execution by one or more processors cause the one or more processors to transmit user input data from a wireless sink device to a wireless source device, wherein the instructions that cause the one or more processors to transmit the user input data from the wireless sink device to the wireless source device further cause the one or more processors to:
  perform capability negotiation to determine one or more categories of user input supported by the wireless source device, wherein the instructions that cause the at one or more processors to perform the capability negotiation further cause the one or more processors to:
    transmit, by the wireless sink device and to the wireless source device a real-time streaming protocol (RTSP) message that indicates a first set of one or more user input supported by the sink device;
    receive, by the wireless sink device and from the wireless source device, an RTSP message that indicates a second set of one or more user input categories supported by the sink device and with which the wireless source device is compatible; and
    transmit, by the wireless sink device and to the wireless source device, a message confirming one of the second set of supported user input categories is enabled;
  after performing the capability negotiation obtain user input data at the wireless sink device;
  generate a data packet header, wherein the data packet header comprises a field to identify the enabled input category of the user input data;
  transmit a data packet comprising the data packet header and payload data, wherein the enabled input category identifies how the payload data is formatted; and
  transmit the data packet to the wireless source device.

28. A wireless sink device configured to transmit user input data to a wireless source device, the wireless sink device comprising:
  means for performing capability negotiation to determine supported categories user input of the wireless source device before obtaining user input data at the wireless sink device, wherein the means for performing the capability negotiation comprises:
    means for transmitting, by the wireless sink device and to the wireless source device a real-time streaming protocol (RTSP) message that indicates a first set of one or more user input categories supported by the sink device;
    means for receiving, by the wireless sink device and from the wireless source device, an RTSP message that indicates a second set of one or more user input categories supported by the sink device and with which the wireless source device is compatible; and means for transmitting, by the wireless sink device and to the wireless source device, a message confirming one of the second set of supported user input categories is enabled;

means for obtaining user input data at the wireless sink device after performing the capability negotiation;

means for generating a data packet header, wherein the data packet header comprises a field to identify the enabled input category of the user input data;

means for generating a data packet comprising the data packet header and payload data, wherein the enabled input category identifies how the payload data is formatted; and means for transmitting the data packet to the wireless source device.

29. A method of receiving user input data from a wireless sink device at a wireless source device, the method comprising:

performing capability negotiation to determine one or more categories of user input supported by the wireless source device, wherein performing the capability negotiation comprises:

receiving, by the wireless source device and from the wireless sink device, a real-time streaming protocol (RTSP) message that indicates a first set of one or more user input categories supported by the sink device;

transmitting, by the wireless source device and to the wireless sink device, an RTSP message that indicates a second set of one or more user input categories supported by the sink device and with which the wireless source device is compatible; and receiving, by the wireless source device and from the wireless sink device, a message confirming one of the second set of supported user input categories is enabled;

after performing the capability negotiation, receiving a data packet comprising a data packet header and payload data;

parsing the data packet header to determine the enabled input category associated with user input data contained in the payload data; and processing the payload data based on the determined input category, wherein the input category identifies how the payload data is formatted.

30. The method of claim 29, wherein the data packet header is an application layer packet header.

31. The method of claim 29, wherein the data packet is to control audio data or video data of the wireless source device.

32. The method of claim 29, wherein the input category is selected from the group consisting of a forwarded command and an operating system (OS) specific command.

33. The method of claim 29, wherein the input category is a generic command.

34. The method of claim 29, further comprising:
parsing the data packet header to determine if an optional timestamp entry is present.

35. The method of claim 29, further comprising:
parsing the data packet header to determine a timestamp identifying a frame of video data being displayed at the time the user input data was obtained by the wireless sink device; and
processing the payload data based on the determined input category.

36. The method of claim 29, further comprising:
parsing the data packet header to determine a version of a protocol being used for communication.

37. The method of claim 29, wherein the data packet is transmitted over TCP/IP.

38. A wireless source device configured to receive user input data from a wireless sink device, the wireless source device comprising:

a transport unit to receive a data packet comprising a data packet header and payload data;

a memory storing instructions;

one or more processors configured to execute the instructions, wherein upon execution of the instructions the one or more processors cause:

performing capability negotiation to determine one or more categories of user input supported by the wireless source device, wherein to perform the capability negotiation, the one or more processors further cause:

receiving, by the wireless source device and from the wireless sink device, a real-time streaming protocol (RTSP) message that indicates a first set of one or more user input categories supported by the sink device;

transmitting, by the wireless source device and to the wireless sink device, an RTSP message that indicates a second set of one or more user input supported by of the sink device and with which the wireless source device is compatible; and receiving, by the wireless source device and from the wireless sink device, a message confirming one of the second set of supported user input categories is enabled;

after performing the capability negotiation, parsing the data packet header to determine an input category associated with user input data contained in the payload data; and processing the payload data based on the determined input category, wherein the input category identifies how the payload data is formatted.

39. The wireless source device of claim 38, wherein the data packet header is an application layer packet header.

40. The wireless source device of claim 38, wherein the data packet is to control audio data or video data of the wireless source device.

41. The wireless source device of claim 38, wherein the input category is selected from the group consisting of a forwarded command and an operating system (OS) specific command.

42. The wireless source device of claim 38, wherein the input category is a generic command.

43. The wireless source device of claim 38, wherein upon execution of the instructions the one or more processors further cause:
parsing the data packet header to determine if an optional timestamp entry is present.

44. The wireless source device of claim 38, wherein upon execution of the instructions the one or more processors further cause:
parsing the data packet header to determine a timestamp identifying a frame of video data being displayed at the time the user input data was obtained by the wireless sink device; and
processing the payload data based on the determined input category.

45. The wireless source device of claim 38, wherein upon execution of the instructions the one or more processors further cause:

parsing the data packet header to determine a version of a protocol being used for communication.

46. The wireless source device of claim 38, wherein the data packet is transmitted over TCP/IP.

47. A non-transitory computer-readable storage medium storing instructions that upon execution by one or more processors cause the one or more processors to receive user input data from a wireless source device at a wireless sink device, wherein the instructions that cause the one or more processors to receive the user input data from the wireless source device further cause the one or more processors to:
- perform capability negotiation to determine one or more categories of user input supported by the wireless source device, wherein the instructions that cause the one or more processors to perform the capability negotiation further cause the one or more processors to:
  - receive, by the wireless source device and from the wireless sink device, a real-time streaming protocol (RTSP) message that indicates a first set of one or more user input categories supported by the sink device;
  - transmit, by the wireless source device and to the wireless sink device, an RTSP message that indicates a second set of one or more user input categories supported by the sink device and with which the wireless source device is compatible;
  - receive, by the wireless source device and from the wireless sink device, a message confirming one of the second set of supported user input categories is enabled;
- after performing the capability negotiation, receive a data packet comprising a data packet header and payload data;
- parse the data packet header to determine the enabled input category associated with user input data contained in the payload data; and
- process the payload data based on the determined input category, wherein the input category identifies how the payload data is formatted.

48. A wireless source device configured to receive user input data from a wireless sink device, the wireless source device comprising:
- means for performing capability negotiation to determine one or more categories of user input supported by the wireless source device, wherein the means for performing the capability negotiation comprises:
  - means for receiving, by the wireless source device and from the wireless sink device, a real-time streaming protocol (RTSP) message that indicates a first set of one or more user input supported by the sink device;
  - means for transmitting, by the wireless source device and to the wireless sink device, an RTSP message that indicates a second set of one or more user input categories supported by the sink device and with which the wireless source device is compatible; and
  - means for receiving, by the wireless source device and from the wireless sink device, a message confirming one of the second set of supported user input data categories is enabled;
- means for receiving a data packet comprising a data packet header and payload data after performing the capability negotiation;
- means for parsing the data packet header to determine the enabled input category associated with user input data contained in the payload data; and
- means for processing the payload data based on the determined input category, wherein the input category identifies how the payload data is formatted.

* * * * *